(12) United States Patent
Park et al.

(10) Patent No.: US 9,607,581 B2
(45) Date of Patent: *Mar. 28, 2017

(54) DISPLAY APPARATUS HAVING OBLIQUE LINES AND METHOD OF DRIVING THE SAME

(71) Applicant: SAMSUNG DISPLAY CO., LTD., Yongin, Gyeonggi-Do (KR)

(72) Inventors: Dong-Won Park, Hwaseong-si (KR); Joon-Chul Goh, Hwaseong-si (KR); Bonghyun You, Yongin-si (KR); KyoungHo Lim, Suwon-si (KR); Sangjin Jeon, Suwon-si (KR); Junki Jeong, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 117 days.

This patent is subject to a terminal disclaimer.

(21) Appl. No.: 14/484,239

(22) Filed: Sep. 11, 2014

(65) Prior Publication Data

US 2015/0262554 A1 Sep. 17, 2015

(30) Foreign Application Priority Data

Mar. 13, 2014 (KR) ........................ 10-2014-0029795

(51) Int. Cl.
*G09G 5/00* (2006.01)
*G09G 5/18* (2006.01)
(Continued)

(52) U.S. Cl.
CPC ................. *G09G 5/18* (2013.01); *G09G 3/20* (2013.01); *G02F 1/136286* (2013.01);
(Continued)

(58) Field of Classification Search
CPC ... G09G 3/2085; G09G 5/18; G02F 1/136286
(Continued)

(56) References Cited

U.S. PATENT DOCUMENTS 4,986,637 A * 1/1991 Yamaguchi ....... G02F 1/133514
345/88
5,146,356 A * 9/1992 Carlson ................. G02F 1/1362
349/145

(Continued)

FOREIGN PATENT DOCUMENTS

CN 103454822 A * 12/2013 ........... G09G 3/3648
EP 0 293 048 A2 11/1988
(Continued)

OTHER PUBLICATIONS

Korean Patent Abstract for KR 10-2004-0092704 A, which corresponds to KR Publ. No. 10-0964586 B1, published Jun. 21, 2010, 1 page.

(Continued)

*Primary Examiner* — Adam J Snyder
(74) *Attorney, Agent, or Firm* — Lewis Roca Rothgerber Christie LLP

(57) ABSTRACT

Provided is a display device including: a display panel, a timing controller, a gate driver, and a data driver. The display panel includes a display area configured to display an image and a non-display area adjacent to one side of the display area. The display area includes oblique lines, intersectional lines crossing and isolated from at least a part of the oblique lines, and pixels. Pixels coupled to the oblique lines or the intersectional lines and arranged along a line in one direction are defined into pixel rows. The display area further includes a plurality of areas divided by the pixel rows being successive. The number of pixels constituting one of adjacent ones of the pixel rows in at least one of the plurality of areas is different from the number of pixels constituting another thereof.

35 Claims, 25 Drawing Sheets

(51) Int. Cl.
*G09G 3/20* (2006.01)
*G02F 1/1362* (2006.01)

(52) U.S. Cl.
CPC .............. *G09G 2300/0426* (2013.01); *G09G 2300/0814* (2013.01); *G09G 2310/0232* (2013.01); *G09G 2310/0278* (2013.01); *G09G 2310/0281* (2013.01)

(58) Field of Classification Search
USPC ....................................................... 345/204
See application file for complete search history.

(56) References Cited

U.S. PATENT DOCUMENTS

| | | | |
|---|---|---|---|
| 6,496,238 | B1 | 12/2002 | Greene et al. |
| 6,654,449 | B1 | 11/2003 | Greene et al. |
| 6,798,475 | B2 * | 9/2004 | Ho .................... G02F 1/134336 349/146 |
| 6,933,998 | B1 * | 8/2005 | Iwahashi ........... G02F 1/136277 349/146 |
| 9,472,147 | B2 * | 10/2016 | Park ..................... G09G 3/3614 |
| 2002/0154076 | A1 | 10/2002 | Greene et al. |
| 2002/0171437 | A1 | 11/2002 | Im |
| 2003/0067429 | A1 * | 4/2003 | Aoki ................... G09G 3/3677 345/87 |
| 2006/0070274 | A1 * | 4/2006 | Maack .............. G02F 1/134336 345/55 |
| 2006/0164350 | A1 * | 7/2006 | Kim ..................... G09G 3/3614 345/87 |
| 2007/0146611 | A1 * | 6/2007 | Kang .................. G02F 1/13452 349/149 |
| 2008/0048934 | A1 * | 2/2008 | Yamamoto ........... G09G 3/3611 345/55 |
| 2008/0316379 | A1 | 12/2008 | Zuidema et al. |
| 2010/0020053 | A1 * | 1/2010 | Sah ...................... G09G 3/3648 345/87 |
| 2010/0171737 | A1 * | 7/2010 | Bae ...................... G09G 3/3648 345/213 |
| 2010/0238148 | A1 * | 9/2010 | Sah ........................ G09G 3/36 345/206 |
| 2011/0174957 | A1 | 7/2011 | Okada |
| 2014/0152938 | A1 * | 6/2014 | Lee ...................... G09G 3/3648 349/46 |
| 2015/0138473 | A1 * | 5/2015 | Zhang ............... G02F 1/134309 349/43 |

FOREIGN PATENT DOCUMENTS

| | | | | |
|---|---|---|---|---|
| JP | 2001-075508 A | | 3/2001 | |
| JP | 2004-341330 A | | 12/2004 | |
| KR | 20050015163 A | * | 2/2005 | ........... G02F 1/1343 |
| KR | 10-0964586 B1 | | 6/2010 | |
| KR | 20110042674 A | * | 4/2011 | ............... G09G 3/36 |
| KR | 10-1142996 B1 | | 5/2012 | |

OTHER PUBLICATIONS

Korean Patent Abstract for KR 10-2006-0079519 A, which corresponds to KR Publ. No. 10-1142996 B1, published May 8, 2012, 1 page.

* cited by examiner

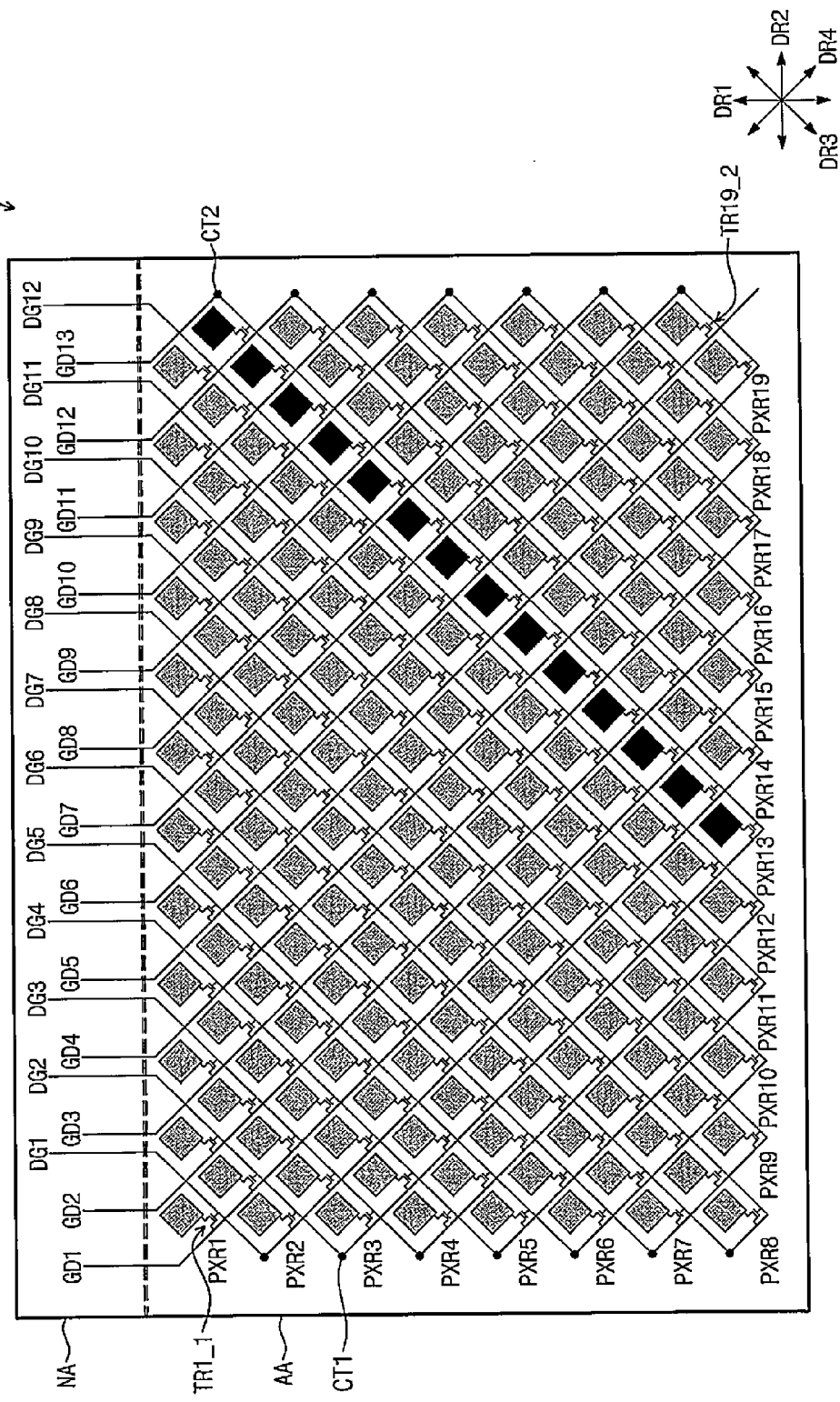

FIG. 22
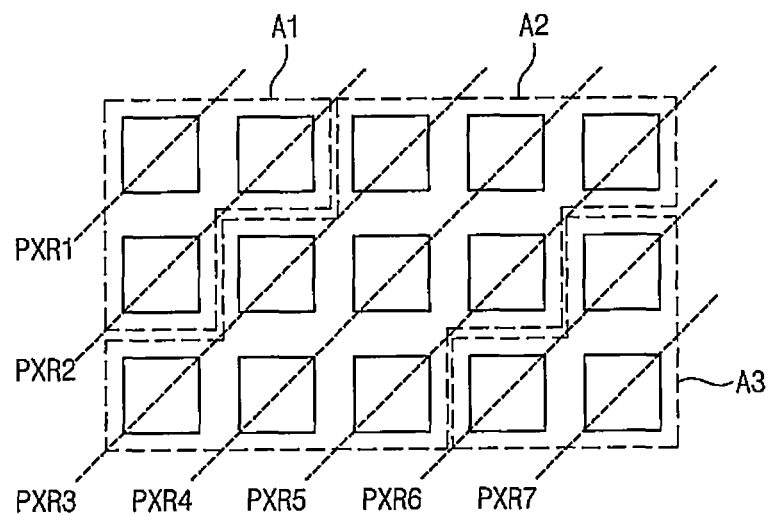
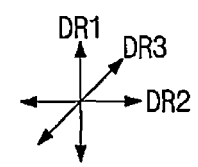

DISPLAY APPARATUS HAVING OBLIQUE LINES AND METHOD OF DRIVING THE SAME

CROSS-REFERENCE TO RELATED APPLICATION

This application claims priority to and the benefit of Korean Patent Application No. 10-2014-0029795 filed on Mar. 13, 2014, in the Korean Intellectual Property Office, the entire content of which is hereby incorporated by reference.

BACKGROUND

1. Field

Aspects of example embodiments of the present invention are directed toward a display device and a driving method thereof, and more particularly, are directed toward a display device including a display panel with a structure capable of implementing narrow bezel and a driving method thereof.

2. Description of the Related Art

In recent years, a Brown tube (or a cathode-ray tube) has been replaced with display devices, such as a liquid crystal display device, an electrophoresis display device, an organic light-emitting display device, and so on.

The display device encompasses a display panel, a gate driver, and a data driver. The display panel has a display area for displaying images and a non-display area surrounding the display area. The display panel further includes gate lines, data lines, and pixels connected to the gate lines and the data lines.

The display panel has a rectangular shape that has a first edge extending in a first direction and a second edge crossing the first direction when viewed from the top. The gate lines are arranged side by side in the first direction, and the data lines are arranged side by side in the second direction.

As a driver integrated circuit, the gate driver is mounted on a printed circuit board which is connected to the first-direction non-display area of the display panel. The gate driver is provided directly on the first-direction non-display area of the display panel through a thin film process.

Research on minimizing the size of the non-display area (or bezel) of the display panel is desirable to cope with consumers' needs. However, a conventional display panel structure has a limit to remove the first-direction non-display area of the display panel because of a location of the gate driver.

SUMMARY

An embodiment of the present invention provides a display device including: a display panel including a display area configured to display an image and a non-display area adjacent to one side of the display area, the display area including oblique lines, intersectional lines crossing and isolated from at least a part of the oblique lines, and pixels, wherein pixels being coupled to the oblique lines or the intersectional lines and arranged along a line in one direction are defined into pixel rows; a timing controller configured to receive a control signal and an input image signal, and to output a first control signal, a second control signal, and a data signal; a gate driver configured to generate a gate signal based on the first control signal, and to output the gate signal to the oblique lines and the intersectional lines via the non-display area; and a data driver configured to output a data voltage, obtained by converting the data signal, to the oblique lines and the intersectional lines via the non-display area in response to the second control signal, wherein the display area further includes a plurality of areas divided by the pixel rows being successive, and the number of pixels constituting one of adjacent ones of the pixel rows in at least one of the plurality of areas is different from the number of pixels constituting another thereof.

In one embodiment, the display panel has two adjacent edges extending in first and second directions that are different from each other, wherein the oblique lines extend in a third direction, crossing the first and second directions, at one end of the display area adjacent to the non-display area, and wherein the intersectional lines extend in a fourth direction, crossing the first, second, and third directions, at the one end of the display area.

In one embodiment, the plurality of areas include: an increasing area in which the number of pixels constituting each pixel row increases every pixel row; a maintaining area in which the number of pixels constituting each pixel row is equal to one another; and a decreasing area in which the number of pixels constituting each pixel row decreases every pixel row.

In one embodiment, each of the oblique lines and the intersectional lines includes at least one of gate lines extending in the third direction and data lines isolated from the gate lines and extending in the fourth direction.

In one embodiment, the display panel further includes a contact portion coupling gate lines and data lines that are overlapped at both ends of the second direction of the display area when viewed from a top.

In one embodiment, the pixels are configured to be driven by the pixel rows.

In one embodiment, the number of pixels configured to be driven during one of adjacent horizontal periods in at least one of the plurality of areas is different from the number of pixels configured to be driven during another thereof.

In one embodiment, the contact portion includes: a first contact portion at one end of the second direction of the display area; and a second contact portion at another end of the second direction of the display area.

In one embodiment, the oblique lines include oblique hybrid lines including gate lines and data lines interconnected by the first contact portion, and oblique gate lines including a part of the gate lines, and the intersectional lines include intersectional hybrid lines including gate lines and data lines interconnected by the second contact portion, and intersectional data lines including a part of the data lines.

In one embodiment, the gate signal and the data voltage are applied to the oblique hybrid lines and the intersectional hybrid lines.

In one embodiment, the display panel further includes thin film transistors coupled to the pixels and to two lines of the oblique lines and the intersectional lines.

In one embodiment, the data voltage has a first data voltage range, and each of the thin film transistors has a threshold voltage greater than an upper value of the first data voltage range.

In one embodiment, each of the thin film transistors includes: a first gate electrode on a substrate and configured to receive the gate signal; a second gate electrode isolated from the first gate electrode, overlapped with the first gate electrode, and configured to receive a sub gate signal different from the gate signal; a semiconductor layer isolated from the first and second gate electrodes and overlapped with the first and second gate electrodes; a source electrode coupled to a part of the semiconductor layer; and a drain electrode spaced apart from the source electrode and coupled to another part of the semiconductor layer.

In one embodiment, the gate signal and the sub gate signal have a same pulse width and different gate on voltages.

In one embodiment, a data voltage applied to a data line of each of the oblique hybrid lines and the intersectional hybrid lines has a first data voltage range, and a data voltage applied to a gate line of each of the oblique hybrid lines and the intersectional hybrid lines has a second data voltage range different from the first data voltage range.

In one embodiment, the second data voltage range is not overlapped with a range defined by a gate on voltage and a gate off voltage of the gate signal.

In one embodiment, each of the first and second contact portions includes: a first resistor between a first node and a second node; and a second resistor between the second node and a third node. A first bias voltage is applied to the first node, the second node is coupled to the data line, and the third node is coupled to the gate line.

In one embodiment, a data voltage having the first data voltage range is obtained by dividing a sum of the first bias voltage and a data voltage having the second data voltage range according to the first and second resistors.

In one embodiment, each of the first and second resistors includes a diode.

In one embodiment, the first and second resistors have a same resistance value.

In one embodiment, a data voltage applied to each of the pixels has a first data voltage range, and a data voltage applied to each of the oblique lines and the intersectional lines has a second data voltage range different from the first data voltage range.

In one embodiment, the second data voltage range is not overlapped with a range defined by a gate on voltage and a gate off voltage of the gate signal.

In one embodiment, each of the thin film transistors includes: a main thin film transistor having a gate electrode coupled to a gate line, a source electrode coupled to a data line, and a drain electrode coupled to a pixel; and a sub thin film transistor having a gate electrode coupled to the gate line, a source electrode coupled to the drain electrode of the main thin film transistor, and a drain electrode configured to receive a second bias voltage.

In one embodiment, a data voltage having the first data voltage range is obtained by dividing a sum of the second bias voltage and a data voltage having the second data voltage range according to the main thin film transistor and the sub thin film transistor.

In one embodiment, the main thin film transistor and the sub thin film transistor have different resistance values.

In one embodiment, pulse widths of gate signals applied to the pixel rows of the increasing area sequentially increase at least step by step, pulse widths of gate signals applied to the pixel rows of the decreasing area sequentially decrease at least step by step, and pulse widths of gate signals applied to the pixel rows of the maintaining area are equal to one another.

In one embodiment, pulse widths of gate signals applied to the pixel rows of the maintaining area are wider than pulse widths of gate signals applied to the pixel rows of the increasing area and pulse widths of gate signals applied to the pixel rows of the decreasing area.

In one embodiment, the plurality of areas include a main area and a sub area that are driven independently within a same frame.

In one embodiment, the main area includes a portion of the pixel rows coupled to at least one of two lines coupled to a first pixel row, from among the oblique lines and the intersectional lines, and the sub area includes a remaining portion of the pixel rows that are not coupled to the two lines.

In one embodiment, a pixel row of the main area and a pixel row of the sub area that are configured to be driven during a same horizontal period are configured to receive a data voltage and a gate signal via different lines.

In one embodiment, the display device further includes a multiplexer coupled to each of at least a part of the oblique lines and each of at least a part of the intersectional lines.

In one embodiment, the multiplexer is configured to receive the gate signal, the data voltage, and a multiplexer control signal, and to selectively output one of the gate signal and the data voltage according to the multiplexer control signal.

In one embodiment, the multiplexer is included in an integrated circuit chip in which the gate driver and the data driver are integrated or the non-display area.

In one embodiment, the multiplexer control signal is switched between a high level and a low level during a horizontal blank period or a vertical blank period.

In one embodiment, the display device further includes: a printed circuit board configured to drive the display panel; and a flexible printed circuit board configured to electrically couple the display panel to the printed circuit board, in which an integrated circuit chip is embedded and electrically connecting the display panel and the printed circuit board.

In one embodiment, the gate driver and the data driver are included in the integrated circuit chip.

Another embodiment of the present invention provides a display device including: a display panel including a first display area configured to display an image, a second display area configured to be driven independently from the first display area, and a non-display area adjacent to one side of the first display area and one side of the second display area, each of the first display area and the second display area including oblique lines, intersectional lines crossing and isolated from at least a part of the oblique lines, and pixels, pixels being coupled to the oblique lines or the intersectional lines and arranged along a line in one direction are defined into pixel rows; a timing controller configured to receive a control signal and an input image signal, and to output a first control signal, a second control signal, and a data signal; a gate driver configured to generate a gate signal based on the first control signal, and to output the gate signal to the oblique lines and the intersectional lines via the non-display area; and a data driver configured to output a data voltage, obtained by converting the data signal, to the oblique lines and the intersectional lines via the non-display area in response to the second control signal, wherein each of the first and second display areas further includes a plurality of areas divided by the pixel rows being successive, and the number of pixels constituting one of adjacent ones of the pixel rows in at least one of the plurality of areas is different from the number of pixels constituting another thereof.

In one embodiment, the gate driver includes a first gate driver configured to output first area gate signals to the oblique lines and the intersectional lines of the first display area; and a second gate driver configured to output second area gate signals to the oblique lines and the intersectional lines of the second display area. The data driver may include a first data driver configured to output a first area data voltage to the oblique lines and the intersectional lines of the first display area; and a second data driver configured to output a second area data voltage to the oblique lines and the intersectional lines of the second display area.

Still another embodiment of the present invention provides a display device including: a display panel including a display area configured to display an image, a first non-display area adjacent to one side of the display area, and a second non-display area adjacent to another side of the display area, the display area including gate lines, data lines crossing and isolated from at least a part of the gate lines, and pixels, wherein pixels being coupled to the gate lines or the data lines and arranged along a line in one direction are defined into pixel rows; a timing controller configured to receive a control signal and an input image signal, and to output a first control signal, a second control signal, and a data signal; a gate driver configured to generate a gate signal based on the first control signal, and to output the gate signal to the gate lines via the first and second non-display areas; and a data driver configured to output a data voltage, obtained by converting the data signal, to the data lines via the first and second non-display areas in response to the second control signal, wherein the display area further comprises a plurality of areas divided by the pixel rows being successive, and the number of pixels constituting one of adjacent ones of the pixel rows in at least one of the plurality of areas is different from the number of pixels constituting another thereof.

In one embodiment, the display panel has two adjacent edges extending in first and second directions that are different from each other, the gate lines extend in a third direction crossing the first and second directions, and the data lines extend in a fourth direction crossing the first, second, and third directions.

In one embodiment, the plurality of areas include: an increasing area in which the number of pixels constituting each pixel row increases every pixel row; a maintaining area in which the number of pixels constituting each pixel row is equal to one another; and a decreasing area in which the number of pixels constituting each pixel row decreases every pixel row.

In one embodiment, the gate lines include upper gate lines configured to receive a part of the gate signals via the first non-display area; and lower gate lines configured to receive remaining gate signals via the second non-display area. The data lines may include lower data lines configured to receive a part of the data voltages via the first non-display area; and lower data lines configured to receive remaining data voltages via the second non-display area.

Still another embodiment of the present invention provides a method of driving a display device which includes a display panel including a display configured to display an image and a non-display area adjacent to one side of the display area, the display area including oblique lines, intersectional lines crossing and isolated from at least a part of the oblique lines, and pixels, wherein pixels being coupled to the oblique lines or the intersectional lines and arranged in a line in one direction are defined into pixel rows, wherein the display area further includes a plurality of areas divided by the pixel rows being successive, the method including: driving a first number of pixels during one of adjacent horizontal periods in at least one of the plurality of areas; and driving a second number of pixels during another one of the adjacent horizontal periods, the first number differing from the second number.

In one embodiment, the method further includes receiving a control signal and an input image signal to output a first control signal, a second control signal, and a data signal; generating a gate signal based on the first control signal to output the gate signal to the oblique lines and the intersectional lines via the non-display area; and outputting a data voltage, obtained by converting the data signal, to the oblique lines and the intersectional lines via the non-display area in response to the second control signal.

In one embodiment, a threshold voltage of each of thin film transistors coupled to the pixels is set to be higher than an upper value of the data voltage.

In one embodiment, the gate signal and the data voltage are applied to oblique hybrid lines of the oblique lines, and the gate signal is applied to oblique gate lines of the oblique lines, and the gate signal and the data voltage are applied to intersectional hybrid lines of the intersectional lines, and the data voltage is applied to intersectional data lines of the intersectional lines.

In one embodiment, a data voltage range of a data voltage applied to a gate line of each of the oblique hybrid lines and the intersectional hybrid lines is different from a data voltage range of a data voltage applied to a data line of each of the oblique hybrid lines and the intersectional hybrid lines.

In one embodiment, a data voltage range of a data voltage applied to a gate line of each of the oblique hybrid lines and the intersectional hybrid lines is level shifted not to be overlapped with a range defined by a gate on voltage and a gate off voltage.

In one embodiment, a data voltage range of a data voltage applied to each pixel is different from a data voltage range of a data voltage applied to each of the oblique lines and the intersectional lines.

In one embodiment, a data voltage range of a data voltage applied to each of the oblique lines and the intersectional lines is level shifted not to be overlapped with a range defined by a gate on voltage and a gate off voltage.

In one embodiment, in the plurality of areas, pulse widths of gate signals applied to pixel rows of an increasing area, in which the number of pixels constituting each pixel row increases every at least one pixel row, sequentially increase at least step by step, pulse widths of gate signals applied to pixel rows of a maintaining area, in which the number of pixels constituting each pixel row is maintained the same, are equal to one another, and pulse widths of gate signals applied to pixel rows of a decreasing area, in which the number of pixels constituting each pixel row decreases every at least one pixel row, sequentially decrease at least step by step.

In one embodiment, in the plurality of areas, a main area including a portion of the pixel rows coupled to at least one of two lines coupled to a first pixel row from among the oblique lines and the intersectional lines, and a sub area including a remaining portion of pixel rows not coupled to the two lines are driven independently.

In one embodiment, the oblique lines and the intersectional lines are coupled to a multiplexer, the multiplexer being configured to output one of the gate signal and the data voltage according to a multiplexer control signal.

In one embodiment, the multiplexer control signal is switched between a high level and a low level during a horizontal blank period or a vertical blank period.

Still another embodiment of the present invention provides a display device including: a display panel comprising a display area configured to display an image and a non-display area adjacent to one side of the display area, the display area comprising gate lines, data lines crossing and isolated from at least a part of the gate lines, and pixels, wherein pixels being coupled to the gate lines or the data lines and arranged along a line in one direction are defined into pixel rows; a timing controller configured to receive a control signal and an input image signal, and to output a first control signal, a second control signal, and a data signal; a gate driver configured to generate a gate signal based on the first control signal, and to output the gate signal to the gate lines via the non-display area; and a data driver configured to output a data voltage, obtained by converting the data signal, to the data lines via the non-display area in response to the second control signal, wherein the display area further comprises a plurality of areas divided by the pixel rows being successive, and the number of pixels constituting one of adjacent ones of the pixel rows in at least one of the plurality of areas is different from the number of pixels constituting another thereof.

In one embodiment, the display panel has two adjacent edges extending in first and second directions that are different from each other, wherein the gate lines extend in the first direction, and wherein the data lines extend in a third direction crossing the first and second directions.

In one embodiment, the non-display area is adjacent to one end of the first direction of the display area.

In one embodiment, the gate lines are coupled to same number of pixels, respectively.

In one embodiment, the pixel rows are formed of pixels coupled to respective data lines, and the plurality of areas include: an increasing area in which the number of pixels constituting each pixel row increases every pixel row; a maintaining area in which the number of pixels constituting each pixel row is equal to one another; and a decreasing area in which the number of pixels constituting each pixel row decreases every pixel row.

In one embodiment, the display panel further includes: a dummy line extending in a direction parallel to the gate lines; and a contact portion coupling the dummy lines to data lines that are overlapped at one end of the first direction of the display area when viewed from a top, the overlapped data lines included in the decreasing area.

In one embodiment, the dummy line is spaced apart from the gate lines at a same layer as the gate lines.

In one embodiment, one end of the dummy line is coupled to the contact portion and another end thereof is in the non-display area.

With embodiments of the present invention, it may be possible to minimize a bezel of a display panel. For example, it may be possible to remove the remaining non-display area other than a non-display area adjacent to one edge of the display device. Also, it may be possible to prevent or substantially prevent a data voltage from acting as a gate signal at a thin film transistor coupled to a pixel when a gate signal and a data voltage are concurrently (e.g., simultaneously) applied to a line. Further, it may be possible to reduce or prevent charging fault of each pixel due to shortening of a horizontal period. Also, it may be possible to apply a gate signal and a data voltage to a line selectively.

BRIEF DESCRIPTION OF THE DRAWINGS

The above and other aspects and features of the present invention will be apparent from the following description with reference to the following figures, wherein like reference numerals refer to like parts throughout the various figures, unless otherwise specified, and wherein:

FIG. 6A is a diagram illustrating a method of driving a 13th pixel row;

FIG. 22 is a diagram schematically illustrating pixels shown in FIG. 21.

DETAILED DESCRIPTION

Figure 1:
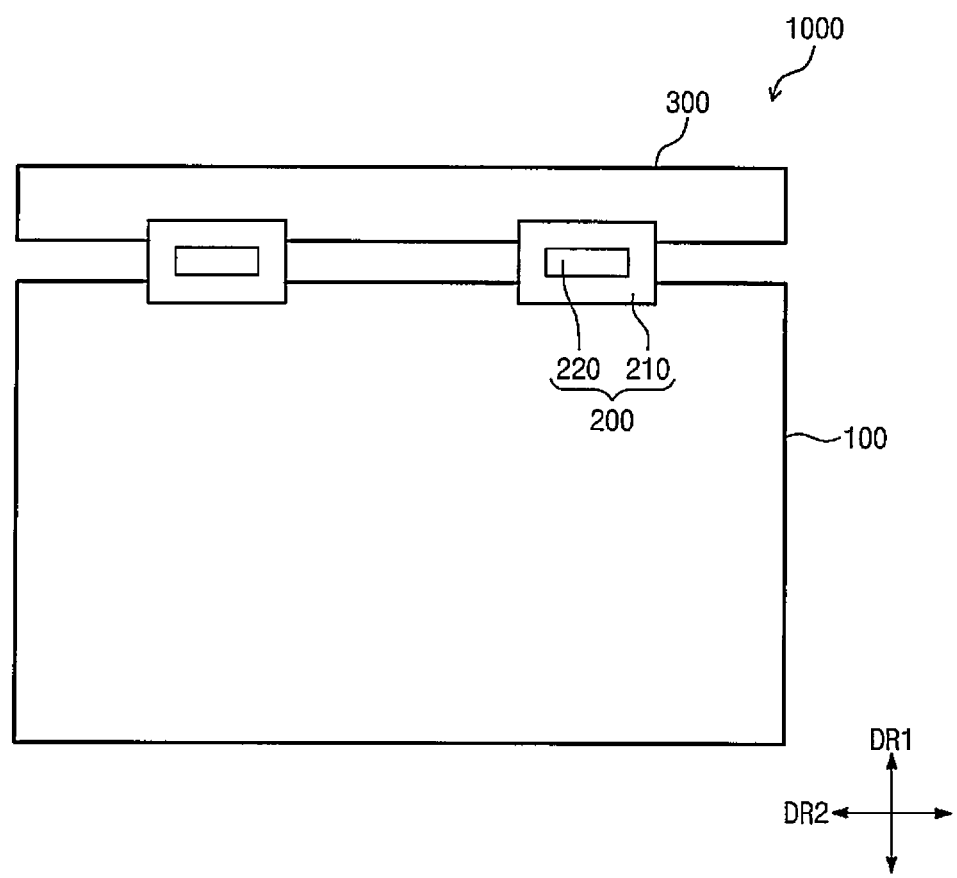
FIG. 1 is a diagram schematically illustrating a display device 1000 according to an embodiment of the present invention.

Aspects of embodiments will be described in detail with reference to the accompanying drawings. The aspects of the present invention, however, may be embodied in various different forms, and should not be construed as being limited only to the illustrated embodiments. Rather, these embodiments are provided as examples so that this disclosure will be thorough and complete, and will fully convey the spirit and scope of the present invention to those skilled in the art. Accordingly, known processes, elements, and techniques are not described with respect to some of the embodiments of the present invention. Unless otherwise noted, like reference numerals denote like elements throughout the attached drawings and written description, and thus descriptions thereof will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a first element, component, region, layer and/or section discussed below could be termed a second element, component, region, layer and/or section without departing from the spirit and scope of the present invention.

Spatially relative terms, such as "beneath", "below", "lower", "under", "above", "upper" and the like, may be used herein for ease of description to describe one element or feature's relationship to another elements) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, for example, the terms "below" and "under" can encompass both an orientation of above and below. Further, the device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular example embodiments only, and is not intended to be limiting of the spirit and scope of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or one or more intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense, unless expressly so defined herein.

Figure 2:
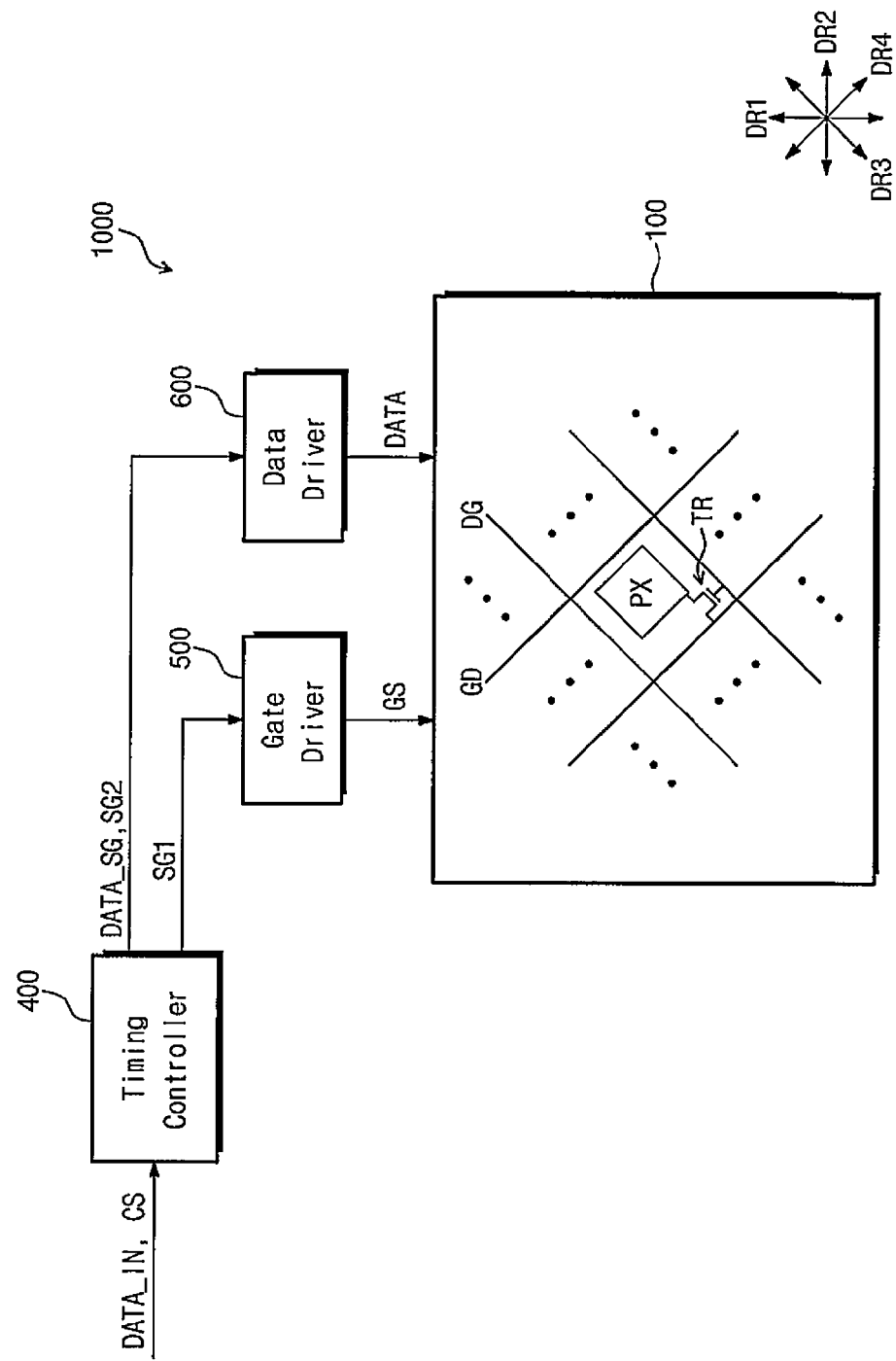
FIG. 2 is a block diagram schematically illustrating a display device 1000 shown in FIG. 1.

FIG. 1 is a diagram schematically illustrating a display device 1000 according to an embodiment of the present invention. FIG. 2 is a block diagram schematically illustrating a display device 1000 shown in FIG. 1.

Referring to FIGS. 1 and 2, a display device 1000 includes a display panel 100, a flexible printed circuit board 200, a printed circuit board 300, a timing controller 400, a gate driver 500, and a data driver 600.

The display panel 100 may include a variety of display panels including, but not limited to, an organic light emitting display panel, a liquid crystal display panel, a plasma display panel, an electrophoretic display panel, and an electrowetting display panel.

The display panel 100 displays images. The display panel 100 includes oblique lines DG and intersectional lines GD crossing the oblique lines DG. The intersectional lines GD are arranged to be isolated from at least a part of the oblique lines DG. The display panel 100 contains a thin film transistor TR coupled to (e.g., connected to) two lines, for example, an oblique line DG and an intersectional line GD, and a pixel PX coupled to the thin film transistor TR. The thin film transistor TR has a gate electrode, a source electrode, and a drain electrode. To the gate electrode is provided a gate signal via one of the two lines. To the source electrode is provided a data voltage via the other one of the two lines. The drain electrode is coupled to the pixel PX. The thin film transistor TR provides the data voltage to the pixel PX in response to the gate signal.

At least one of the oblique lines DG is supplied with a gate signal GS provided from the gate driver 500 and a data voltage DATA provided from the data driver 600. At least one of the intersectional lines GD receives the gate signal GS and the data voltage DATA. The display panel including the oblique lines DG and the intersectional lines GS arranged as described above will be described later.

A shape of the display panel 100, when viewed from the top, may be suitably varied. In the below description, it is assumed that the display panel 100 has a rectangular or square shape when viewed from the top, however the present invention is not limited thereto. A short-edge direction of the display panel 100 may be defined as a first direction DR1, and a long-edge direction thereof may be defined as a second direction DR2.

The flexible printed circuit board 200 couples (e.g., connects) the display panel 100 to the printed circuit board 300 electrically. The flexible printed circuit board 200 includes a base film 210 and an integrated circuit chip 220 formed on the base film 210.

One end of the first direction DR1 of the flexible printed circuit board 200 is coupled (e.g., connected) electrically to the display panel 100, and the other end thereof is coupled to the printed circuit board 300 electrically.

In FIG. 1, there is illustrated an example where the display device 1000 includes two flexible printed circuit boards 200 spaced apart from each other in the second direction DR2. However, the present invention is not limited thereto. For example, the number of flexible printed circuit boards 200 may be changed variously.

The flexible printed circuit board 200 is flexible. The flexible printed circuit board 200 may be bent in a "C" shape and mounted on the back of the display panel 100.

The printed circuit board 300 plays a role of driving the display panel 100. The printed circuit board 300 is formed of a driver substrate and a plurality of circuit parts mounted on the driver substrate. The printed circuit board 300 is mounted on the back of the display panel 100, with the flexible printed circuit board 200 bent and mounted.

The timing controller 400 receives an input image signal DATA_IN and a control signal CS from an external graphics controller.

The timing controller 400 generates a first control signal SG1 and a second control signal SG2 in response to the control signal CS. The control signal CS includes, for example, a vertical synchronization signal, a horizontal synchronization signal, a main clock, a data enable signal, and so on.

The timing controller 400 converts the input image signal DATA_IN into a data signal DATA_SG that is suitable for the specification of the data driver 600, and outputs the data signal DATA_SG to the data driver 600.

The first control signal SG1 may be a gate control signal for controlling an operation of the gate driver 500. The first control signal SG1 may include, but is not limited to, a gate clock, an output enable signal, and a vertical start signal.

The second control signal SG2 may be a data control signal for controlling an operation of the data driver 600. The second control signal SG2 may include, but is not limited to, a horizontal start signal for indicating the beginning of an operation of the data driver 600, an inversion signal for inverting a polarity of a data voltage, and an output direction signal for deciding timing when a data voltage is output from the data driver 600.

The gate driver 500 generates the gate signal in response to the first control signal SG1. The gate driver 500 is coupled electrically to the oblique lines DG and the intersectional lines GD, and provides the gate signal to the oblique lines DG and the intersectional lines GD.

The data driver 600 provides the oblique lines DG and the intersectional lines GD with the data voltage DATA, as a result of converting the data signal DATA_SG in response to the second control signal SG2.

The gate driver 500 and the data driver 600 may be formed in one unified integrated circuit chip 220. However, the present invention is not limited thereto. For example, the gate driver 500 and the data driver 600 may be formed of independent chips, which are mounted on the flexible printed circuit board 200 or the printed circuit board 300.

Figure 3A:
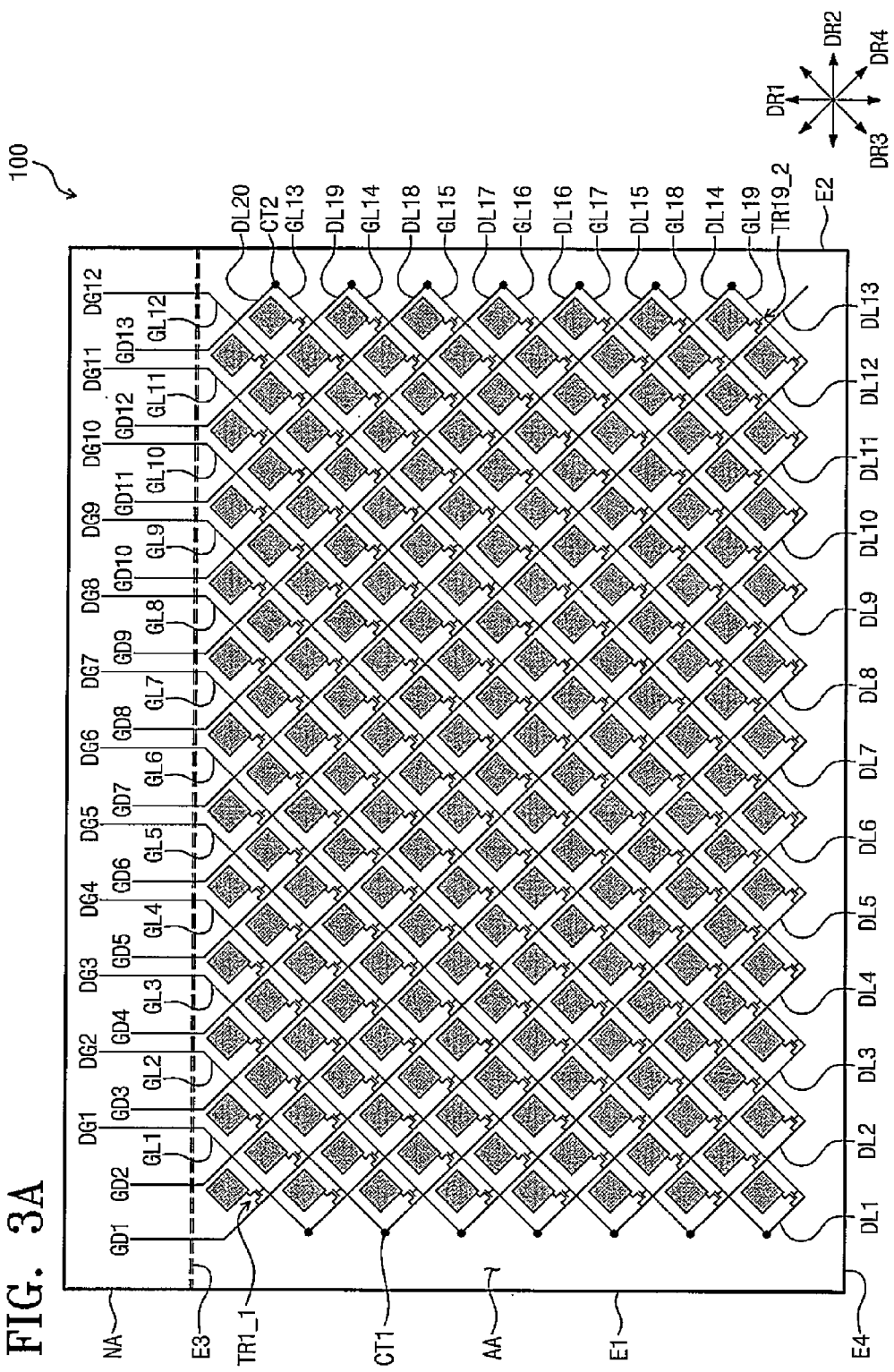
FIG. 3A is a diagram schematically illustrating a display panel 100 shown in FIGS. 1 and 2.
Figure 3B:
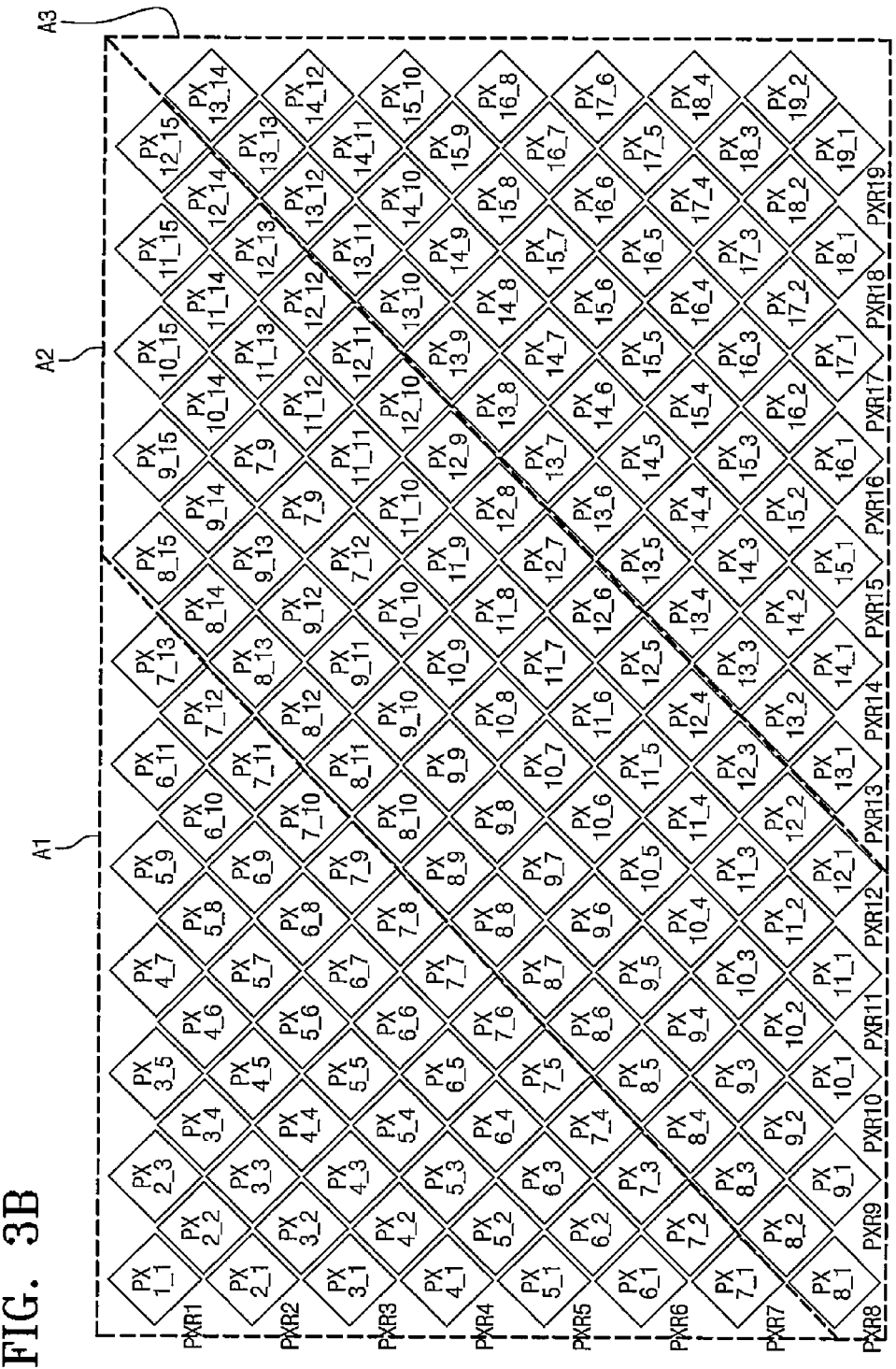
FIG. 3B is a diagram schematically illustrating pixels shown in FIG. 3A.
Figure 3C:
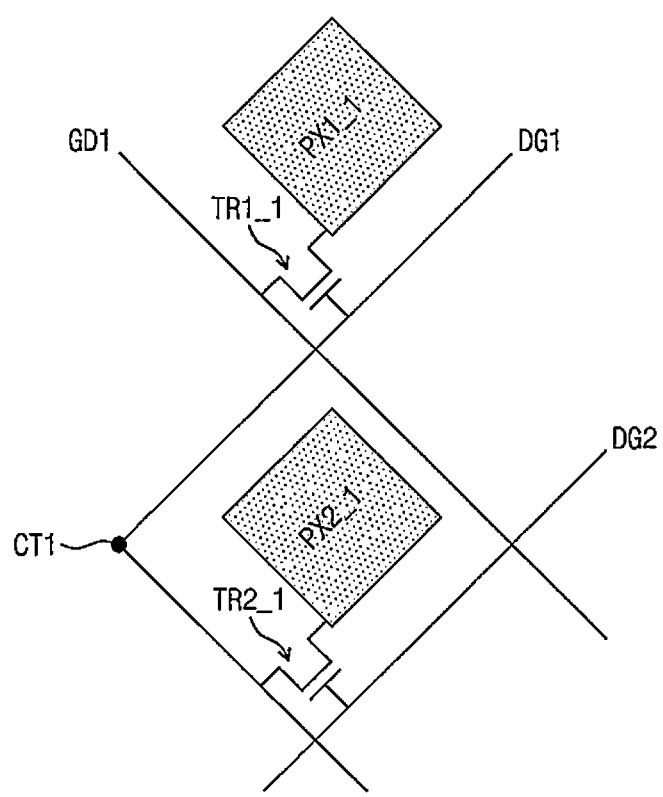
FIG. 3C is an enlarged diagram of a first pixel at the first row and a first pixel at the second row shown in FIG. 3A.

FIG. 3A is a diagram schematically illustrating a display panel 100 shown in FIGS. 1 and 2. FIG. 3B is a diagram schematically illustrating pixels shown in FIG. 3A. FIG. 3C is an enlarged diagram of a first pixel at the first row and a first pixel at the second row shown in FIG. 3A.

Referring to FIGS. 2 and 3A to 3C, a display panel 100 includes a display area AA and a non-display area NA. The display area AA displays images and includes oblique lines DG, intersectional lines GD, and pixels PX. The display area AA may further comprise first to fourth edges E1 to E4. The first and second edges E1 and E2 may extend in the first direction DR1. The third and fourth edges E3 and E4 may extend in the second direction DR2. The display panel 100 may further comprise a substrate, The substrate may be divided into the display area AA and the non-display area NA when viewed from a top.

The non-display area NA may be an area where images are not displayed, and is formed at a periphery of the display panel 100. The non-display area NA may be adjacent to one side of the first direction DR1 of the display area AA. In detail, the non-display area NA may be adjacent to the third edge E3 of display area AA in the first direction DR1. A pad portion may be provided at (e.g., in) the non-display area NA. The pad portion may be coupled to the oblique lines DG and the intersectional lines GD to provide the oblique lines DG and the intersectional lines GD with a gate signal GS from a gate driver 500 (refer to FIG. 2) and a data voltage DATA from a data driver 600 (refer to FIG. 2).

The oblique lines DG and the intersectional lines GD may extend in an oblique direction with respect to the first direction DR1 and the second direction DR2. That is, the oblique lines DG and the intersectional lines GD extend in the oblique direction may mean (or may refer to) not only that they extend in a straight-line shape, but also that they may extend in a zigzag shape and the extending direction is the oblique direction.

The oblique lines DG and the intersectional lines GD may be defined on the basis of a direction which extends from one end (e.g., in FIG. 3, the top of the display panel 100), adjacent to the non-display area NA, of the first direction DR1 of the display area AA. In the description below, the oblique lines DG may extend in a third direction DR3 that crosses (e.g., intersects) the first direction DR1 and the second direction DR2 from one end of the first direction DR1 of the display area AA. The intersectional lines GD may extend in a fourth direction DR4 that crosses the first to third directions DR1 to DR3 from one end of the first direction DR1 of the display area AA. An angle between the third direction DR3 and the fourth direction DR4 may be set variously (e.g., 30°, 45°, 60°, and so on). In the below description, it is assumed that an angle between the third direction DR3 and the fourth direction DR4 is 90°.

The oblique lines DG may be a plurality of oblique lines, and the intersectional lines GD may be in plurality of intersectional lines. For example, in FIG. 3A, the oblique lines DG include 1st to 12th oblique lines DG1 to DG12, and the intersectional lines GD include 1st to 13th intersectional lines GD1 to GD13. However, the present invention is not limited thereto.

The pixels PX are provided at pixel areas that are defined by the oblique lines DG1 to DG12 and the intersectional lines GD1 to GD13. When viewed from the top, shapes of the pixels PX may be changed or modified variously according to an arrangement of the oblique lines DG and the intersectional lines GD. In FIGS. 3A and 3B, there is illustrated an example where each pixel PX has a diamond shape.

Among the pixels PX, pixels that are coupled to an oblique line DG or an intersectional line GD, and are disposed in a line in the third direction DR3 may be defined as a pixel row. The pixel row may include 1st to 19th pixel rows PXR1 to PXR19, but the present invention is not limited thereto.

In the below description, when a specific pixel is identified, a number of a pixel row to which the specific pixel belongs may be marked together with a symbol indicating a location of the specific pixel placed in the pixel row on the basis of the third direction DR3 from a left corner to a right corner. For example, since a pixel PX2_1 coupled to the first oblique line DG1 and the second oblique line DG2 is a first pixel of a second pixel row, it is defined as a 2nd-row 1st pixel PX2_1.

Similarly, a thin film transistor coupled to the 2nd-row 1st pixel PX2_1 is defined as a 2nd-row 1st thin film transistor TR2_1. Thin film transistors coupled to the 2nd pixel row PXR2 may be referred to as 2nd-row thin film transistors.

Similarly, a data voltage applied to the 2nd-row 1st thin film transistor TR2_1 may be referred to as a second-row first data voltage, and data voltages applied to the 2nd-row thin film transistors may be referred to as 2nd-row data voltages.

Also, a gate signal applied to a thin film transistor coupled to a pixel row may be marked by the same reference numeral as the pixel row. For example, a gate signal applied to the 2nd-row thin film transistors may be referred to as a second gate signal.

In FIGS. 3A and 3B, there are illustrated 1st to 19th pixel rows PXR1 to PXR19, that is, 180 pixels PX1_1 to PX19_2. Also, 180 thin film transistors TR1_1 to TR19_2 coupled to the pixels PX1_1 to PX19_2 may be included. However, the present invention is not limited thereto.

The number of pixels in one of two adjacent pixel rows may be different from that in the other thereof. The display area AA is divided into three areas by the pixel rows, based on whether the number of pixels in each pixel row increases, is maintained, or decreases on the basis of adjacent pixel rows (or, the second direction DR2). The three areas may include an increasing area A1, a maintaining area A2, and a decreasing area A3.

The increasing area A1 includes 1st to 7th pixel rows PXR1 to PXR7. The number of pixels in each pixel row may increase in an arithmetic sequence every at least one pixel row toward the seventh pixel row PXR7 from the first pixel row PXR1. Referring to FIGS. 3A and 3B, the 1st pixel row PXR1 includes one pixel, the 2nd pixel row PXR2 includes three pixels, and the seventh pixel row PXR7 includes 13 pixels. That is, the number of pixels may increase by 2 whenever a row changes. However, the present invention is not limited thereto. For example, the number of pixels in the 1st pixel row may be equal to that in the 2nd pixel row. The number of pixels in the 3rd pixel row may be equal to that in the 4th pixel row, and the number of pixels in each of the 3rd and 4th pixel rows may be greater than that in each of the 1st and 2nd pixel rows.

The maintaining area A2 includes 8th to 12th pixel rows PXR8 to PXR12, which include the same number of pixels. In FIGS. 3A and 3B, each of the 8th to 12th pixel rows PXR8 to PXR12 may include 15 pixels. The decreasing area A3 includes 13th to 19th pixel rows PXR13 to PXR19. The number of pixels in each pixel row may decrease in an arithmetic sequence every at least one pixel row toward the 19th pixel row PXR19 from the 13th pixel row PXR13. Referring to FIGS. 3A and 3B, the 13th pixel row PXR13 includes 14 pixels, the 14th pixel row PXR14 includes 12 pixels, and the 19th pixel row PXR19 includes 2 pixels. That is, the number of pixels may decrease by 2 whenever a row changes. However, the present invention is not limited thereto. For example, the number of pixels in the 13th pixel row may be equal to that in the 14th pixel row. The number of pixels in the 18th pixel row may be equal to that in the 19th pixel row, and the number of pixels in each of the 18th and 19th pixel rows may be smaller than that in each of the 13th and 14th pixel rows.

In FIG. 3A, there is illustrated an example where the number of pixels in the increasing area A1 is different from that in the decreasing area A3. However, the present invention is not limited thereto. For example, the increasing area A1 and the decreasing area A3 may include the same number of pixels according to the size and shape of the display panel 100.

Each of the oblique lines DG and the intersectional lines GD may include at least one of gate lines GL and data lines DL.

The shapes of the gate and data lines GL and DL will now be described.

When viewed from the top, the gate lines GL may extend in the third direction DR3 and the data lines DL may extend in the fourth direction DR4. The gate lines GL and the data lines DL are disposed at different layers with an insulation material interposed therebetween. That is, the gate lines GL and the data lines DL are isolated from one another.

The gate lines GL include 1st to 19th gate lines GL1 to GL19, which are spaced apart from one another in the fourth direction DR4. Each of the 1st to 19th gate lines GL1 to GL19 is coupled (e.g., connected) to gate electrodes of thin film transistors coupled to a pixel row. For example, a first gate line GL1 is coupled to a 1st-row first thin film transistor TR1_1 coupled to a 1st-row first pixel PX1_1, and a 2nd gate line GL2 is coupled to 2nd-row thin film transistors coupled to respective pixels in a 2nd pixel row PX2_1 to PX2_3. Likewise, the 19th gate line GL19 is coupled to 19th-row thin film transistors respectively coupled to pixels in the 19th pixel row PX19_1 to PX19_2.

The data lines DL may include 1st to 20th data lines DL1 to DL20, which are spaced apart from one another in the third direction DR3. The 1st to 20th data lines DL1 to DL20 are respectively coupled to source electrodes of thin film transistors coupled to the pixels PX1_1 to PX19_2.

The display panel 100 further comprises contact portions CT1 and CT2.

The contact portions CT1 and CT2 may be disposed between a periphery edge and pixels most adjacent to the periphery edge. The periphery edge comprises at least one of the first edge E1, the second edge E2, and the fourth edge E4 of display area AA. In FIG. 3A, there is illustrated an example where the periphery edge is consist of the first edge E1 and the second edge E2.

The gate lines GL and the data lines DL that are overlapped, when viewed from the top, at both ends of the second direction DR2 of the display area AA may be interconnected through the contact portions CT1 and CT2. Since the gate lines GL and the data lines DL are disposed at different layers, the contact portions CT1 and CT2 may be formed by contact holes formed between the gate lines GL and the data lines DL and a conductive material filled in the contact holes.

The contact portions CT1 and CT2 may include a first contact portion CT1 formed at one end of the second direction DR2 of the display area AA and a second contact portion CT2 formed at the other end of the second direction DR2 of the display area AA.

When viewed from the top, a 1st gate line GL1 and a 7th data line DL7 are overlapped at one end (e.g., a left side of FIG. 3A) of the second direction DR2 of the display area AA and are interconnected via the first contact portion CT1. Likewise, each of the remaining gate lines GL2 to GL7 and each of the remaining data lines DL1 to DL6 are overlapped at one end (e.g., a left side of FIG. 3A) of the second direction DR2 of the display area AA and are interconnected via the first contact portion CT1.

When viewed from the top, a 13th gate line GL13 and a 20th data line DL20 are overlapped at the other end (e.g., a right side of FIG. 3A) of the second direction DR2 of the display area AA and are interconnected via the second contact portion CT2. Likewise, each of the remaining gate lines GL14 to GL19 and each of the remaining data lines DL14 to DL19 are overlapped at the other end (e.g., a right side of FIG. 3A) of the second direction DR2 of the display area AA and are interconnected via the second contact portion CT2.

The oblique lines DG include oblique hybrid lines DG1 to DG7 and oblique gate lines DG8 to DG12.

Each of the oblique hybrid lines DG1 to DG7 includes a gate line GL, a data line DL, and the first contact portion CT1. In FIG. 3A, the oblique hybrid lines DG1 to DG7 may be 1st to 7th oblique lines DG1 to DG7.

Each of the oblique hybrid lines DG1 to DG7 includes a gate line GL and a data line DL that are interconnected via the first contact portion CT1 at one end of the second direction DR2 of the display area AA. For example, a 1st oblique line DG1 includes a first gate line GL1 and a 7th data line DL7 that are interconnected. Likewise, a 7th oblique line DG7 includes a 7th gate line GL7 and a 1st data line DL1 that are interconnected.

Each of the oblique gate lines DG8 to DG12 includes a gate line GL. In FIG. 3A, the oblique gate lines DG8 to DG12 may be 8th to 12th oblique lines DG8 to DG12.

The oblique gate lines DG8 to DG12 include 8th to 12th gate lines GL8 to GL12, respectively. Since each of the 8th to 12th gate lines GL8 to GL12 is not overlapped with a data line DL at one end of the second direction DR2 of the display area AA, each of the 8th to 12th gate lines GL8 to GL12 is not coupled (e.g., connected) to the data line DL.

However the present invention is not limited thereto, and in the event that the number of oblique lines DG decreases in proportion to a decrease in the size or plane shape of the display panel 100, oblique lines DG may be formed only on oblique hybrid lines.

The intersectional lines GD include intersectional hybrid lines GD7 to GD13 and intersectional data lines GD1 to DG6.

Each of the intersectional hybrid lines GD7 to GD13 includes a gate line GL, a data line DL, and a second contact portion CT2. In FIG. 3A, the intersectional hybrid lines GD7 to GD13 may be 7th to 13th intersectional lines GD7 to GD13.

Each of the intersectional hybrid lines GD7 to GD13 includes a gate line GL and a data line DL that are interconnected via the second contact portion CT2 at the other end of the second direction DR2 of the display area AA. For example, a seventh intersectional line GD7 includes a 19th gate line GL19 and a 14th data line DL14 that are interconnected. Likewise, a 13th intersectional line GD13 includes a 13th gate line GL13 and a 20th data line DL20 that are interconnected.

Each of the intersectional data lines GD1 to GD6 includes a data line DL. In FIG. 3A, the intersectional data lines GD1 to GD6 may be 1st to 6th intersectional lines GD1 to GD6.

The intersectional data lines GD1 to GD6 include 8th to 13th data lines DL8 to DL13, respectively. Since each of the 8th to 13th data lines DL8 to DL13 is not overlapped with a gate line GL at the other end of the second direction DR2 of the display area AA, each of the 8th to 13th data lines DL8 to DL13 is not coupled to the gate line GL.

However the present invention is not limited thereto, and in the event that the number of intersectional lines GD decreases in proportion to a decrease in the size or plane shape of the display panel 100, intersectional lines GD may be formed only on intersectional hybrid lines.

The pixels PX1_1 to PX19_2 may be driven by the pixel row. During a 1st horizontal period, a first pixel row PXR1 is driven. Pixel rows may be driven sequentially. Thus, a 19th pixel row PXR19 may be driven during a 19th horizontal period.

In the increasing and decreasing areas A1 and A3, the number of pixels included in one of adjacent pixel rows is different from that included in the other thereof. This may mean that in the increasing and decreasing areas A1 and A3, the number of pixels driven during each of adjacent horizontal periods varies. In the maintaining area A2, the number of pixels included in one of adjacent pixel rows is equal to that included in the other thereof. This may mean that in the maintaining area A2, the number of pixels driven during a horizontal period is maintained to be the same for every horizontal period.

The display panel 100 of embodiments of the present invention has a structure in which gate lines GL and data lines DL are coupled through contact portions CT1 and CT2 at both ends of the second direction DR2 by arrangement of the oblique lines DG1 to DG12 and the intersectional lines GD1 to GD13. With this structure, it is possible to remove or minimize a non-display area at a periphery of the second direction DR2 of the display area AA. In other words, the display panel 100 only includes a non-display area NA for formation of a pad portion at one end of the first direction DR1, and bezels corresponding to the three remaining edges may be removed or minimized.

A driving method of a display panel 100 will be described with reference to FIGS. 4A to 6B.

Figure 4A:
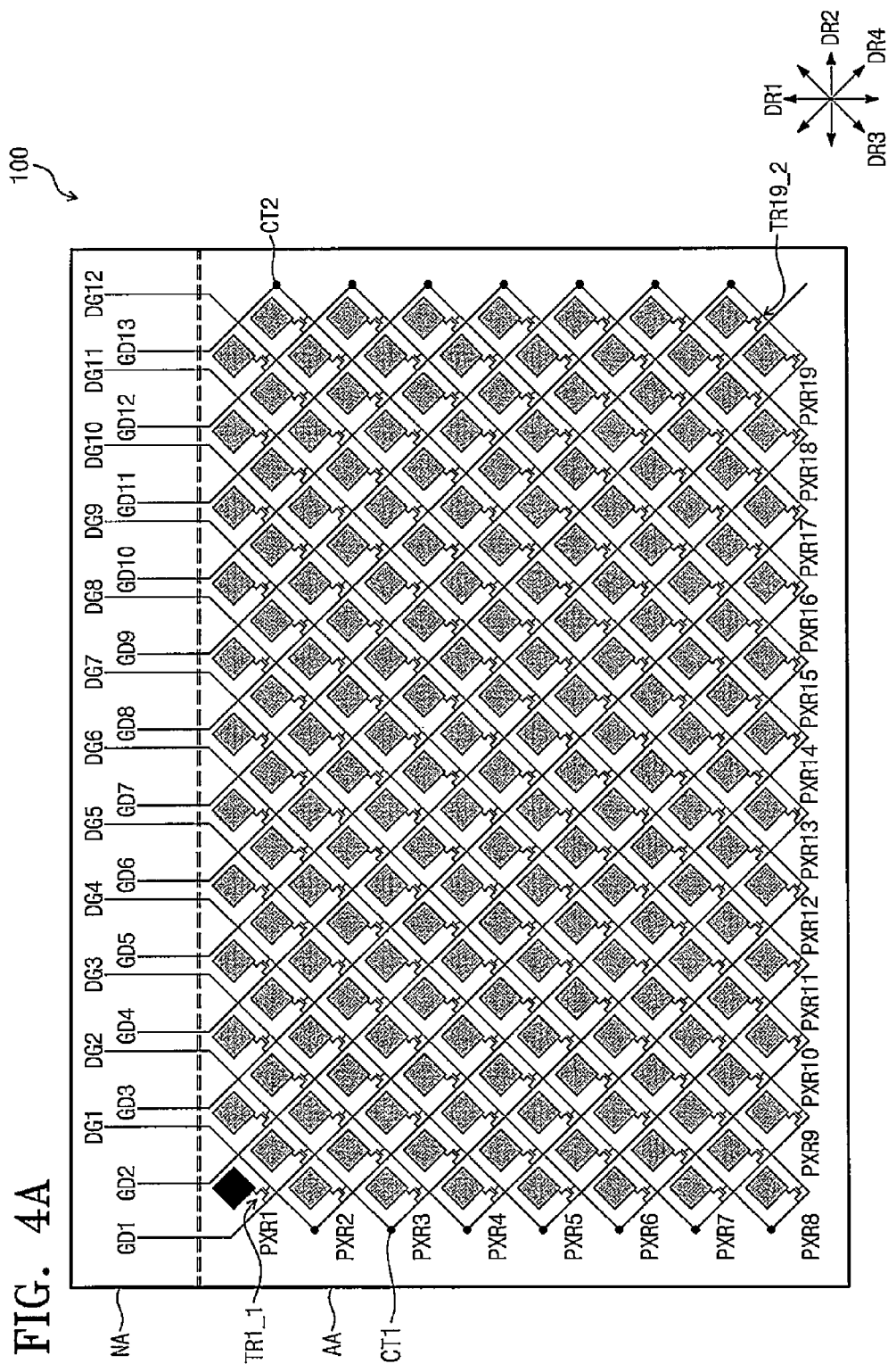
FIG. 4A is a diagram illustrating a method of driving a 1st pixel row.
Figure 4B:
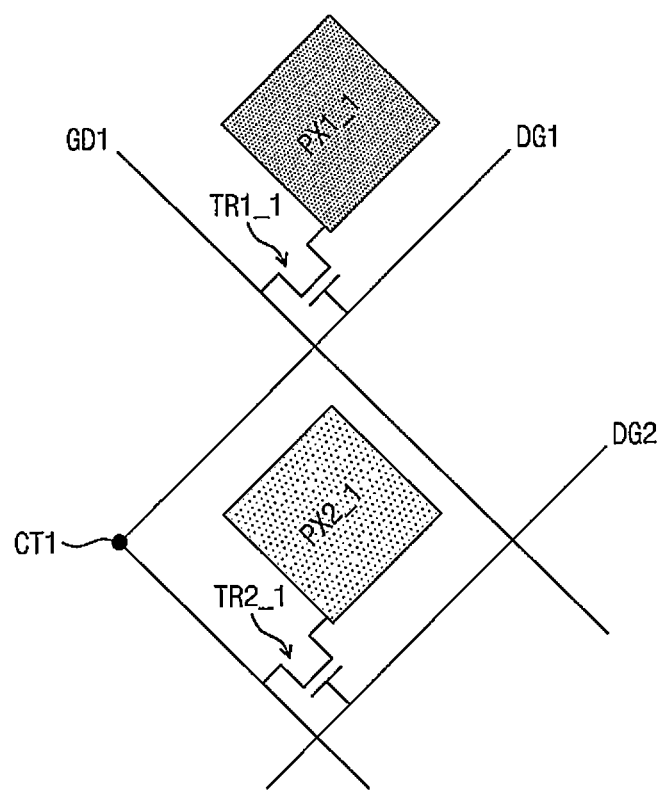
FIG. 4B is an enlarged diagram of a 1st-row 1st pixel and a 2nd-row 1st pixel shown in FIG. 4A.
Figure 5A:
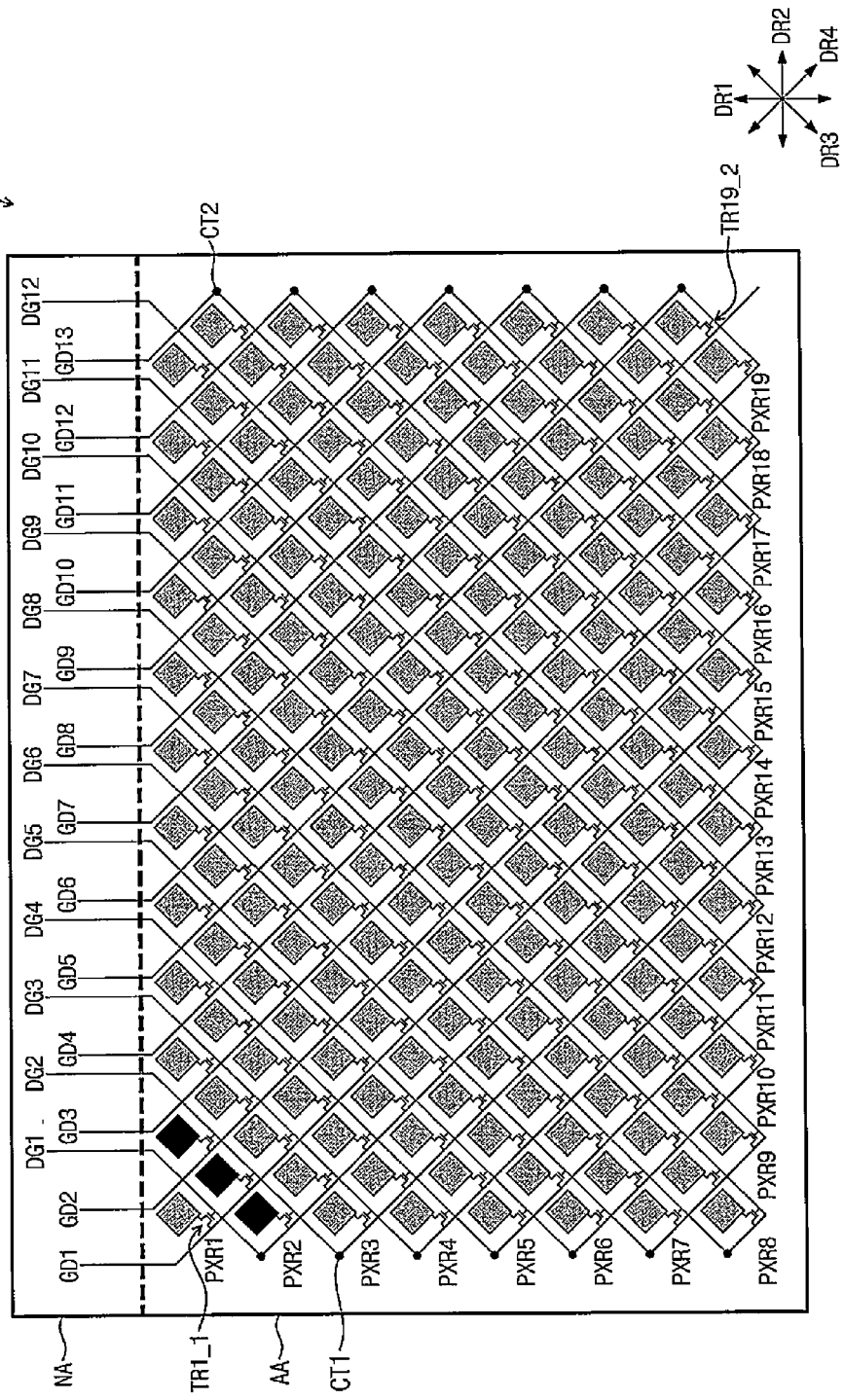
FIG. 5A is a diagram illustrating a method of driving a 2nd pixel row.
Figure 5B:
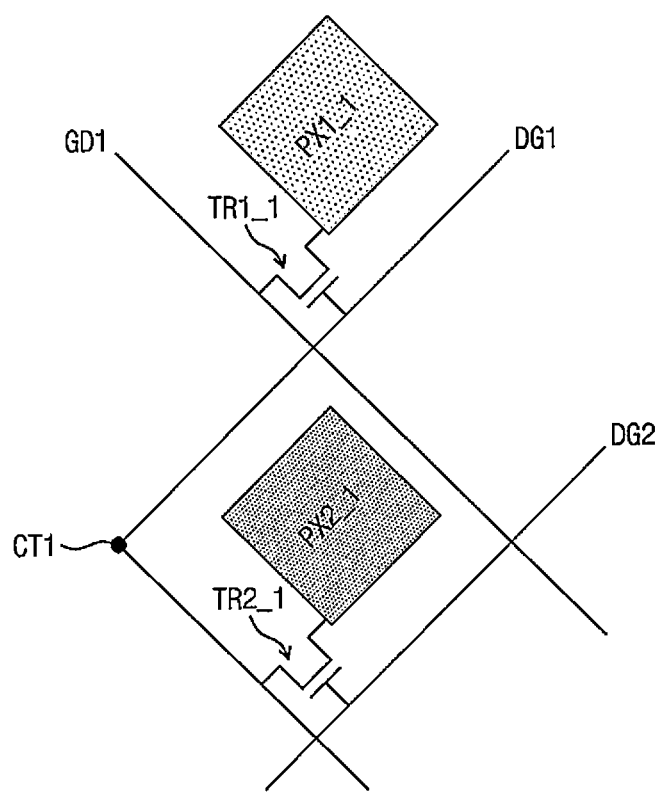
FIG. 5B is an enlarged diagram of a 1st-row first pixel and a 2nd-row 1st pixel shown in FIG. 5A.
Figure 6B:
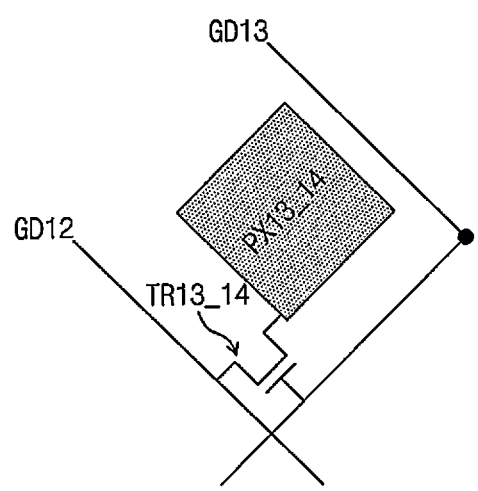
FIG. 6B is an enlarge diagram of a 13th-row 14th pixel shown in FIG. 6A.

FIG. 4A is a diagram illustrating a method of driving a 1st pixel row PXR1, FIG. 5A is a diagram illustrating a method of driving a 2nd pixel row PXR2, and FIG. 6A is a diagram illustrating a method of driving a 13th pixel row PXR13. FIGS. 4B and 5B are enlarged diagrams of a 1st-row 1st pixel and a 2nd-row 1st pixel shown in FIGS. 4A and 5A. FIG. 6B is an enlarge diagram of a 13th-row 14th pixel shown in FIG. 6A.

Referring to FIGS. 4A and 4B, during a 1st horizontal period, a first gate signal is applied to a first oblique line DG1 and a first data voltage synchronized with the first gate signal is applied to an intersectional line GD1. A 1st-row 1st thin film transistor TR1_1 transfers the first data voltage to a 1st-row 1st pixel PX1_1 in response to the first gate signal. Thus, a 1st pixel row PXR1 formed of one pixel emits light (e.g., for displaying an image) corresponding to the first data voltage.

Referring to FIGS. 5A and 5B, during a 2nd horizontal period, a second gate signal is applied to a second oblique line DG2, and a second data voltage synchronized with the second gate signal is applied to an oblique line DG1, the first intersectional line GD1, and a second intersectional line GD2 during the 2nd horizontal period. A 2nd-row 1st thin film transistor TR2_1, a 2nd-row 2nd thin film transistor, and a 2nd-row 3rd thin film transistor transfer the second data voltage to respective pixels in a 2nd pixel row PXR2 in response to the second gate signal. Thus, the pixels in the 2nd pixel row PXR2 emits light corresponding to the second data voltage.

The first gate signal is applied to the first oblique line DG1 during the 1st horizontal period, but the second data voltage is applied to the first oblique line DG1 during the 2nd horizontal period being a next horizontal period. One of a gate signal and a data signal may be applied to oblique hybrid lines DG1 to DG7 each including a gate line GL and a data line DL that are interconnected. A gate signal may be applied to oblique gate lines DG8 to DG12 each formed of a gate line GL.

3rd to 12th gate signals may be applied sequentially to 3rd to 12th oblique lines DG3 to DG12 in the same manner as the 1st and 2nd pixel rows PXR1 and PXR2. In this case, 3rd to 12th pixel rows PXR3 to PXR12 may be driven sequentially to emit light (e.g., to display images).

Referring to FIGS. 6A and 6B, a 13th gate signal is applied to the 13th intersectional line GD13 during a 13th horizontal period. During the 13th horizontal period, a 13th row data voltage synchronized with the 13th gate signal is applied to the 1st oblique line DG1, the 2nd oblique line DG2, and the 1st to 12th intersectional lines GD1 to GD12. The 13th-row thin film transistors transfer the 13th row data voltage respectively to pixels in a 13th pixel row PXR13 in response to the 13th gate signal. For example, the 13th-row 14th thin film transistor transfers a 13th-row 14th data voltage to a 13th-row 14th pixel PX13_14 in response to the 13th gate signal. Thus, the pixels in the 13th pixel row PXR13 emit light corresponding to the 13th-row data voltage.

The 1st to 12th gate signals may be applied sequentially to the 1st to 12th oblique lines DG1 to DG12. 13th to 19th gate signals are applied to 7th to 13th intersectional lines GD7 to GD13 in reverse order.

One of a gate signal and a data signal may be applied to intersectional hybrid lines GD7 to GD13 each including a gate line GL and a data line DL that are interconnected. A data signal may be applied to intersectional data lines GD1 to GD6 each formed of a data line DL.

An undesirable result that may occur when a gate signal and a data signal are respectively applied to an oblique line and a intersectional line, will now be described with reference to FIGS. 7 and 8.

Figure 7:
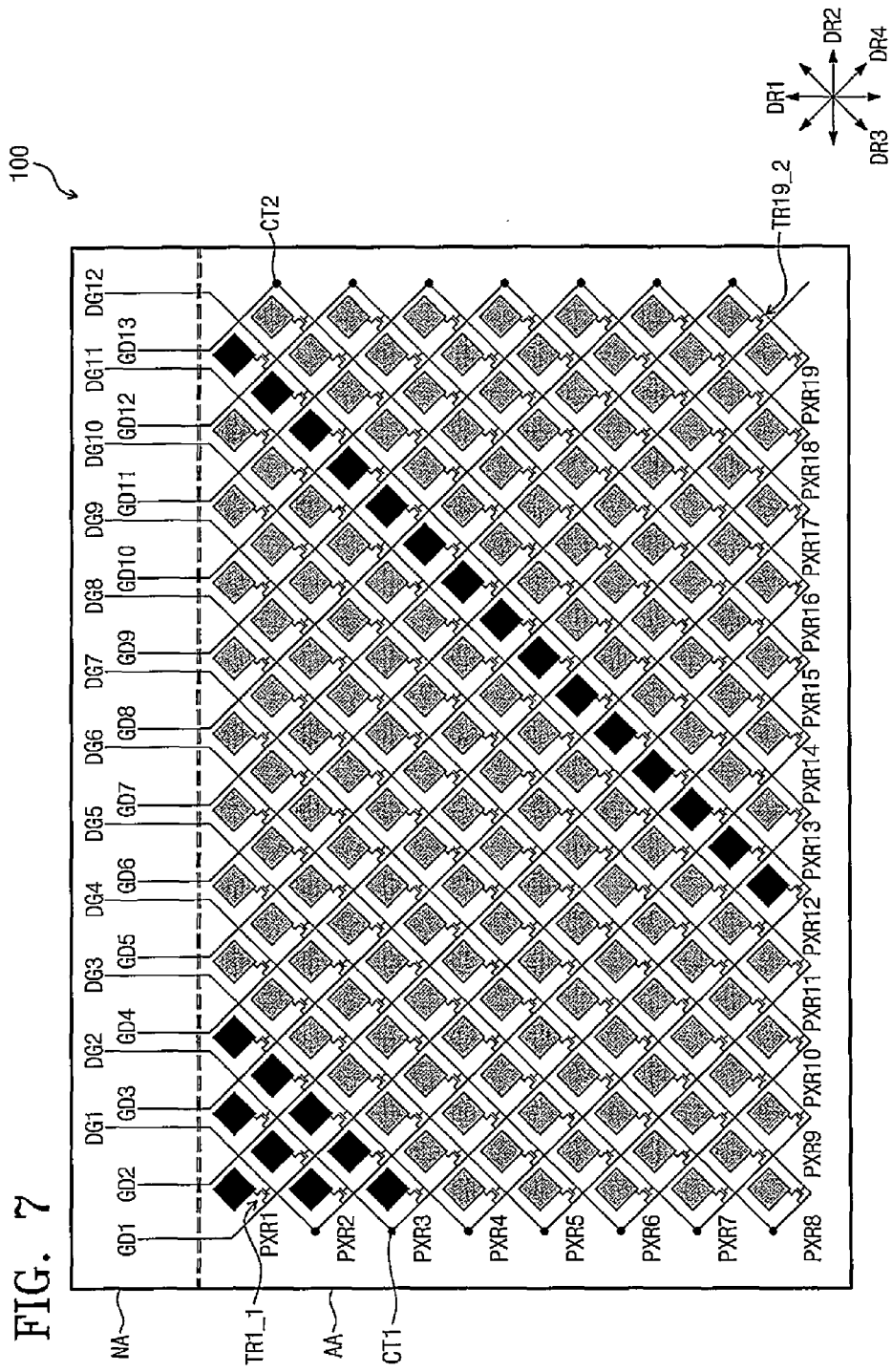
FIG. 7 is a diagram schematically illustrating a display panel at a point in time when a 12th pixel row is driven.

FIG. 7 is a diagram schematically illustrating a display panel at a point in time when a 12th pixel row is driven. FIG. 8 is a graph showing a voltage-to-current characteristic of a thin film transistor.

Gate signals that are applied sequentially for every pixel row may be formed of a gate on voltage V1 and a gate off voltage V2. Voltage levels of the gate on voltage V1 and the gate off voltage V2 may be decided according to characteristics of thin film transistors TR1_1 to TR19_2 coupled (e.g., connected) to the pixels.

Figure 8:
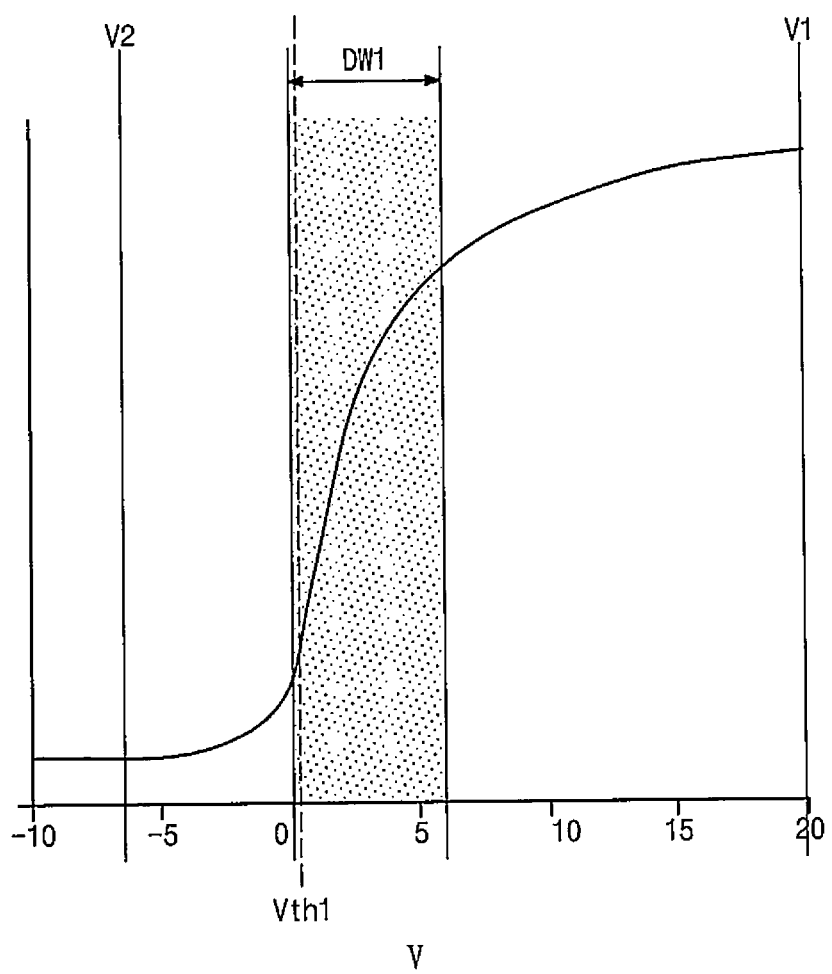
FIG. 8 is a graph showing a voltage-to-current characteristic of a thin film transistor.

In the event that a thin film transistor has a voltage-to-current characteristic shown in FIG. 8, the gate on voltage V1 is set to 20 V and the gate off voltage V2 is set to −7 V. The voltage-to-current characteristic shown in FIG. 8 is only an example, and the present embodiment is not limited thereto. For example, the gate on voltage V1 and the gate off voltage V2 may be changed according to a physical characteristic of a material of a thin film transistor. In the description below, a thin film transistor coupled to a respective pixel and having a characteristic of FIG. 8 will be described as an example.

A data voltage that is applied sequentially every pixel row has a first data voltage range DW1 according to a gray scale. The data voltage may have a voltage level corresponding to a gray scale level within the first data voltage range DW1. The first data voltage range DW1 may be decided according to characteristics of thin film transistors TR1_1 to TR19_2.

The first data voltage range DW1 may be between the gate on voltage V1 and the gate off voltage V2. For example, the first data voltage range DW1 may be between 0V to 6 V.

A point in time when a 12th pixel row PXR12 is driven will be described with reference to FIG. 7. A 12th gate signal is applied to a 12th oblique line DG12 during a 12th horizontal period. A 12th-row data signal synchronized with the 12th gate signal is applied to 1st to 3rd oblique lines DG1 to DG3 and 1st to 12th intersectional lines GD1 and GD12 during the 12th horizontal period. 12th-row thin film transistors transfer the 12th row data voltage respectively to the pixels in a 12th pixel row PXR12 in response to the 12th gate signal.

Data voltages, applied to 12th-row 1st to 3rd pixels PX12_1 to PX12_3, from among the 12th row data voltage may be applied through the 1st to 3rd oblique lines DG1 to DG3. Since the first data voltage range DW1 is between the gate on voltage V1 and the gate off voltage V2, data voltage applied through the 1st to 3rd oblique lines DG1 to DG3 may also be used as gate signals for the 1st to 3rd pixel rows PXR1 to PXR3. Thus, the 1st to 3rd pixel rows PXR1 to PXR3 that are driven together during the 12th horizontal period when the 12th pixel row PXR12 is driven may be undesired.

In the description below, methods of preventing a data voltage from being used (or utilized) as a gate signal will be described.

1. Shift of Threshold Voltage of Thin Film Transistor

Figure 9:
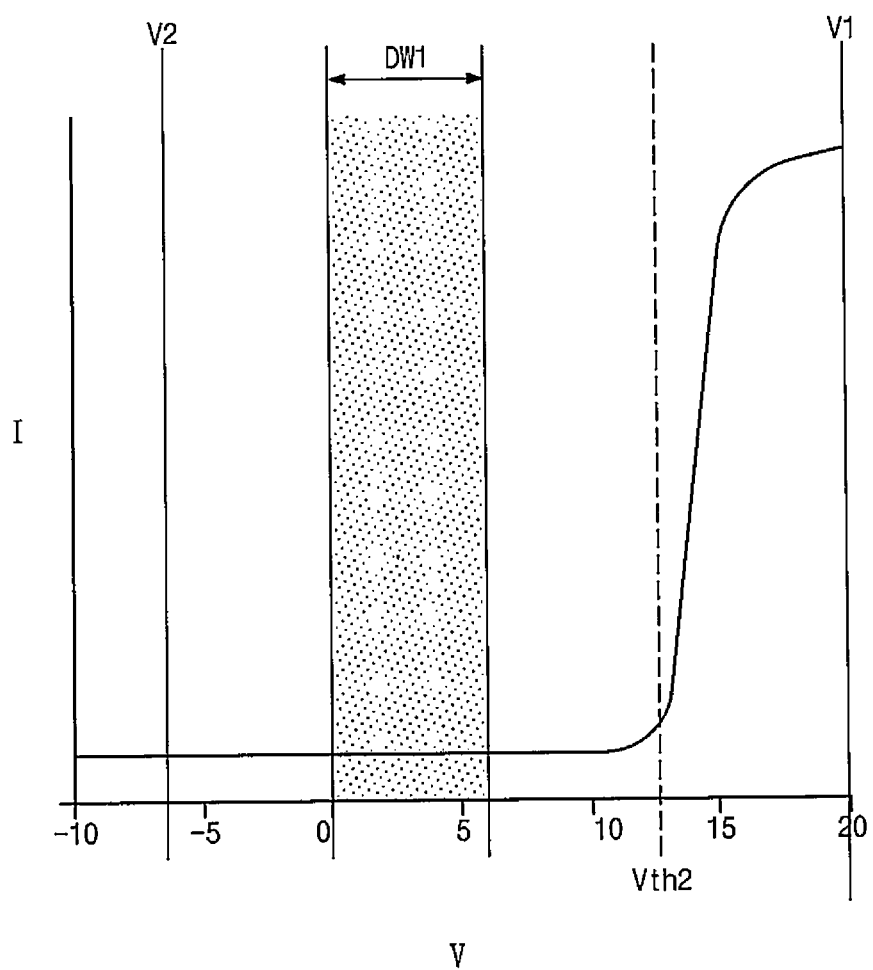
FIG. 9 is a diagram schematically illustrating a voltage-to-current characteristic of a thin film transistor coupled to each pixel of an embodiment of the present invention.

FIG. 9 is a diagram schematically illustrating a voltage-to-current characteristic of a thin film transistor coupled to each pixel of an embodiment of the present invention.

In the description below, a thin film transistor coupled to each pixel will be more fully described with reference to FIGS. 8 and 9.

A thin film transistor of FIG. 8 may have a first threshold voltage Vth1 that belongs to a first data voltage range or is lower than the first data voltage range. In FIG. 8, it is assumed that the first threshold voltage Vth1 is 0.6 V.

Returning to FIG. 7, since a first threshold voltage of a thin film transistor has a voltage level within a first data voltage range, data voltages that are applied via 1st to 3rd oblique lines DG1 to DG3 during a 12th horizontal period may be used or utilized as gate signals for the 1st to 3rd pixel rows PXR1 to PXR3.

Referring to FIG. 9, a thin film transistor has a second threshold voltage Vth2 that is greater than or equal to an upper value of a first data voltage range DW1. Now will be described a point in time when a 12th pixel row PXR12 shown in FIG. 7 is driven when a thin film transistor coupled to each pixel of the embodiment of the present invention has the second threshold voltage Vth2. Since data voltages that are applied via 1st to 3rd oblique lines DG1 to DG3 during a 12th horizontal period have a voltage level smaller than the second threshold voltage Vth2, they may not be used as gate signals for the 1st to 3rd pixel rows PXR1 to PXR3. Thus, during the 12th horizontal period, only the 12th pixel row PXR12 is driven. In this case, remaining pixel rows may not be driven. Thin film transistors coupled respectively to pixels are designed to have the second threshold voltage Vth2, thereby preventing a data voltage from being used or utilized as a gate signal as described above.

A voltage level of the first threshold voltage Vth1 of a typical thin film transistor is shifted to design a thin film transistor with the second threshold voltage Vth2.

Figure 10:
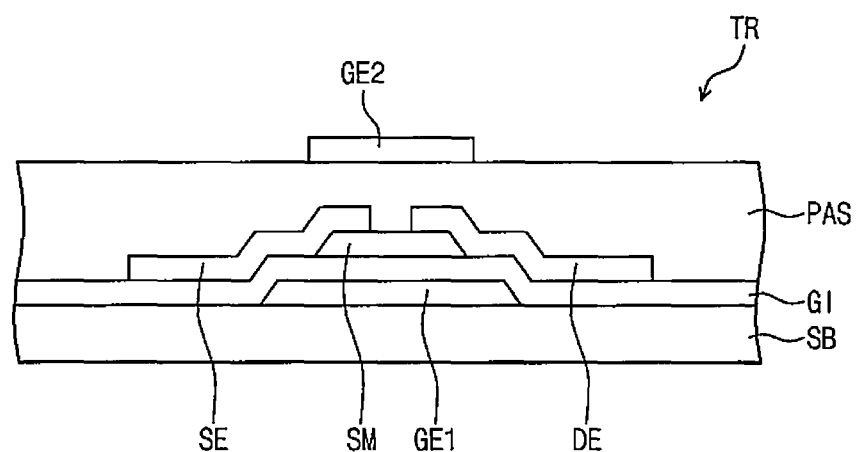
FIG. 10 is a cross-sectional view of a structure of a thin film transistor coupled to each pixel of an embodiment of the present invention.

FIG. 10 is a cross-sectional view of a structure of a thin film transistor coupled to each pixel of an embodiment of the present invention.

Referring to FIG. 10, a thin film transistor TR includes a first gate electrode GE1, a gate insulation film GI, a semiconductor layer SM, source and drain electrodes SE and IDE, a passivation PAS, and a second gate electrode GE2.

The first gate electrode GE1 is disposed on a substrate SB and receives a gate signal. The gate insulation film GI is formed of an insulation material and insulates the first gate electrode GE1, the semiconductor layer SM, and the source and drain electrodes SE and DE. The semiconductor layer SM is disposed to be overlapped with the first and second gate electrodes GE1 and GE2 on the gate insulation film G1. The source and drain electrodes SE and DE are space apart from each other and parts thereof are coupled to the semiconductor layer SM. The passivation PAS is formed of an insulation material and is disposed on the source and drain electrodes SE and DE and the semiconductor layer SM. The second gate electrode GE2 is disposed on the passivation PAS.

The first gate electrode GE1 receives a gate signal applied from a oblique line DG or an intersectional line GD. The second gate electrode GE2 receives a sub gate signal different from the gate signal. The gate signal and the sub gate signal are synchronized and have the same or substantially the same pulse width. However, a gate on voltage of the gate signal may have a different voltage level from a gate on voltage of the sub gate signal.

A threshold voltage of the thin film transistor TR may be shifted by applying different signals to the first gate electrode GE1 and the second gate electrode GE2. For example, a threshold voltage of a thin film transistor coupled to each pixel of the above described embodiment is set to be greater than or equal to an upper value of a first data voltage range DW1 by adjusting a gate on voltage of the sub gate signal applied to the second gate electrode GE2.

2. Shift of First Data Voltage Range (1)

Figure 11:
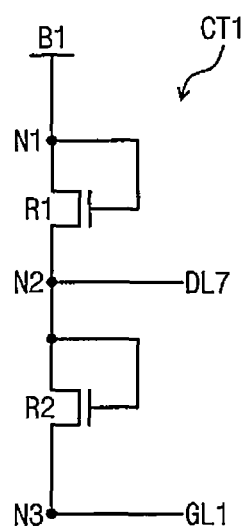
FIG. 11 is a circuit diagram schematically illustrating a first contact portion of a first oblique line shown in FIG. 3C.
Figure 12:
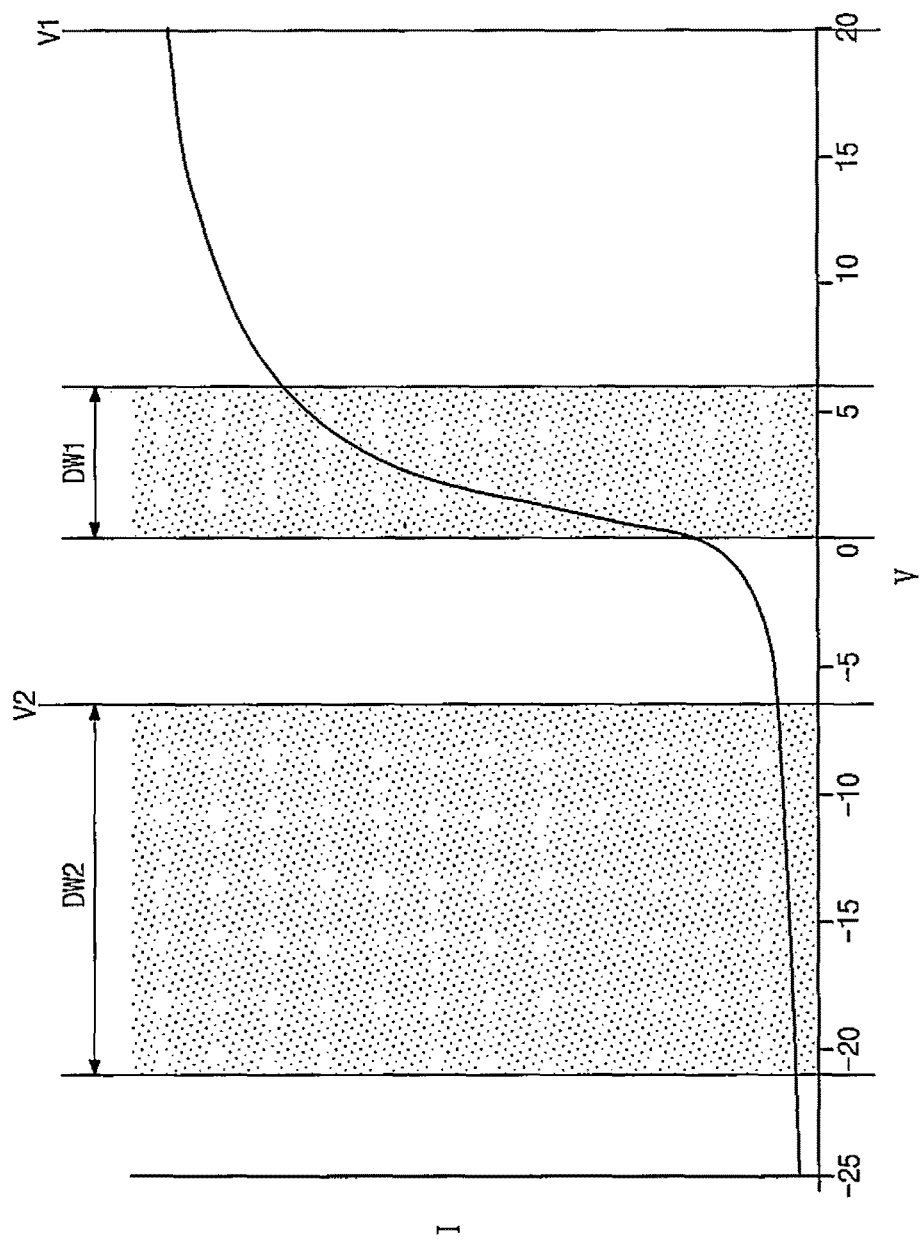
FIG. 12 is a diagram schematically illustrating a voltage-to-current characteristic of a thin film transistor coupled to each pixel of an embodiment of the present invention and a second data voltage range.

FIG. 11 is a circuit diagram schematically illustrating a first contact portion of a first oblique line shown in FIG. 3C. FIG. 12 is a diagram schematically illustrating a voltage-to-current characteristic of a thin film transistor coupled to each pixel of the embodiment of the present invention and a second data voltage range.

In FIG. 11, there is illustrated an example of a first contact portion CT1. The same structure or substantially the same structure as the first contact portion CT1 may be applied to the remaining first contact portions CT1 and second contact portions CT2 (refer to FIG. 3A).

Referring to FIGS. 3A, 3B, 11, and 12, a data voltage range of a data voltage applied to gate lines of oblique hybrid lines DG1 to DG7 and intersectional hybrid lines GD7 to GD13 may be set to be different from a data voltage range of a data voltage applied to data lines of oblique hybrid lines DG1 to DG7 and intersectional hybrid lines GD7 to GD13. For example, a data voltage range of a data voltage applied to the gate lines of the oblique hybrid lines DG1 to DG7 and the intersectional hybrid lines GD7 to GD13 may be level shifted not to be overlapped with a voltage between a gate on voltage V1 and a gate off voltage V2. In other words, a data voltage applied to the gate lines of the oblique hybrid lines DG1 to DG7 and the intersectional hybrid lines GD7 to GD13 may be greater than or equal to the gate on voltage V1 or smaller than or equal to the gate off voltage V2.

The first contact portion CT1 includes first, second, and third nodes N1, N2, and N3 that are arranged sequentially in a thickness direction of a display panel 100. A first resistor R1 is formed between the first node N1 and the second node N2, and a second resistor R2 is formed between the second node N2 and the third node N3. A 7th data line DL7 is coupled (e.g., connected) to the second node N2, and a 1st gate line GL1 is coupled to the third node N3. A first bias voltage B1 is provided to the first node N1.

Each of the first and second resistors R1 and R2 is implemented with a diode. For example, each of the first and second resistors R1 and R2 is formed of a diode coupled (e.g., diode connected) transistor. As a result of dividing the first bias voltage B1 through the first and second resistors R1 and R2, a voltage of the second node N2 may be between a voltage (e.g., the first bias voltage B1) of the first node N1 and a voltage of the third node N3.

The first and second resistors R1 and R2 have the same or substantially the same resistance value. However, the present invention is not limited thereto. For example, a resistance value of the first resistor R1 may be different from that of the second resistor R2.

A data voltage applied to data lines DL of the oblique hybrid lines DG1 to DG7 and the intersectional hybrid lines GD7 to GD13 may belong to the first data voltage range DW1. A data voltage applied to gate lines GL of the oblique hybrid lines DG1 to DG7 and the intersectional hybrid lines GD7 to GD13 may belong to the second data voltage range DW2.

A data voltage, belonging to the second data voltage range DW2, applied to the gate lines GL of the oblique hybrid lines DG1 to DG7 may be level shifted through the first contact portion CT1 into a data voltage belonging to the first data voltage range DW1. The level shifted voltage may be applied to a data line DL.

The second data voltage range DW2 may not be overlapped with a range defined by the gate on voltage V1 and the gate off voltage V2. In more detail, a lower value of the second data voltage range DW2 is greater than or equal to the gate on voltage V1, and an upper value of the second data voltage range DW2 is smaller than or equal to the gate off voltage V2. Below, it is assumed that the upper value of the second data voltage range DW2 is smaller than or equal to the gate off voltage V2. For example, the first data voltage range DW1 may be 0 V to 7 V, the second data voltage range DW2 may be −21 V to 7 V, and the first bias voltage B1 may be 21 V.

A data voltage with the first data voltage range DW1 is obtained by: (B1+VDW2)/(R1+R2). Herein, B1 indicates the first bias voltage, VDW2 indicates a data voltage with the second data voltage range DW2, and R1 and R2 indicate resistance values of the first and second resistors R1 and R2.

During a 1st horizontal period, a first gate signal is applied to a 1st oblique line DG1 to drive a 1st pixel row PXR1. During the 1st horizontal period, a 1st row data voltage with the first data voltage range DW1 is applied to a 1st intersectional line GD1.

Afterwards, during a 2nd horizontal period, a second gate signal is applied to a 2nd oblique line DG2 to drive a 2nd row PXR2. A data voltage with the second data voltage range DW2 is applied to a 1st oblique line DG1. Since the upper value of the second data voltage range DW2 is smaller than or equal to the gate off voltage V2, a data voltage with the second data voltage range DW2 is not used as a gate signal. The data voltage with the second data voltage range DW2 is divided by the first and second resistors R1 and R2 of the first contact portion CT1 to be shifted into the first data voltage range DW1. A 2nd-row 1st thin film transistor transfers a data voltage with the first data voltage range DW1 to a 2nd-row 1st pixel PX2_1 in response to the second gate signal.

A data voltage with the first data voltage range DW1 applied to data lines DL of the intersectional hybrid lines GD7 to GD13 is level shifted into a data voltage with the second data voltage range DW2 through the second contact portion CT2, and the shifted data voltage is applied to the gate line GL. Since the second data voltage range DW2 is smaller than or equal to the gate off voltage V2, a data voltage with the second data voltage range DW2 may not be used as a gate signal.

A data voltage applied to the gate lines GL of the oblique hybrid lines DG1 to DG7 and the intersectional hybrid lines GD7 to GD13 has the second data voltage range DW2, and the second data voltage range DW2 is set to be greater than or equal to the gate on voltage V1 or smaller than or equal to the gate off voltage V2. Thus, a data voltage applied to a gate line may not act as a gate signal.

Shift of First Data Voltage Range (2)

Figure 13:
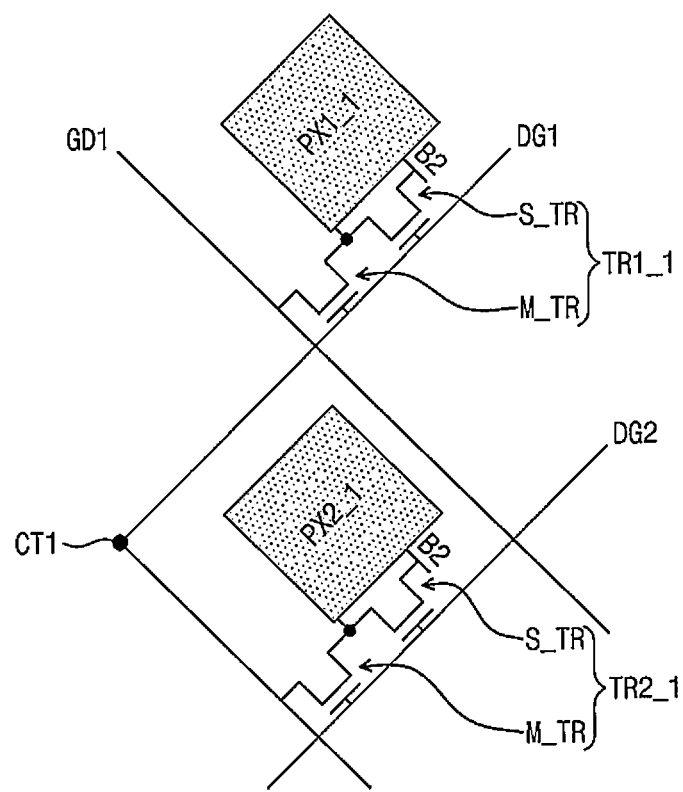
FIG. 13 is a diagram schematically illustrating a 1st-row 1st pixel and a 2nd-row 1st pixel of a display panel according to another embodiment of the present invention.

FIG. 13 is a diagram schematically illustrating a 1st-row 1st pixel and a 2nd-row 1st pixel of a display panel according to another embodiment of the present invention.

In FIG. 13 a 1st-row 1st thin film transistor TR1_1 and a 2nd-row 1st thin film transistor TR2_1 are described as examples. However, the remaining thin film transistors may have the same or substantially the same structure as described in FIG. 13.

Referring to FIGS. 3A, 12, and 13, a data voltage range of a data voltage applied to pixels PX1_1 to PX19_2 may be set to be different from a data voltage range of a data voltage applied to oblique lines DG1 to DG12 and intersectional lines GD1 to GD13. For example, level shifting may be made such that a data voltage range of a data voltage applied to the oblique lines DG1 to DG12 and the intersectional lines GD1 to GD13 are not overlapped with a voltage between a gate on voltage V1 and a gate off voltage V2. In other words, a data voltage applied to the oblique lines DG1 to DG12 and the intersectional lines GD1 to GD13 may be greater than or equal to the gate on voltage V1 or smaller than or equal to the gate off voltage V2.

The first contact portion CT1 may be directly interconnect the gate line GL of the oblique hybrid lines DG1 to DG7 and the data line DL of the oblique hybrid lines DG1 to DG7. The second contact portion CT2 may be directly interconnect the gate line GL of the intersectional hybrid lines GD7 to GD13 and the data line DL of the intersectional hybrid lines GD7 to GD13.

Each of thin film transistors TR1_1 and TR2_1 coupled (e.g., connected) to the respective pixels includes a sub thin film transistor S_TR and a main thin film transistor M_TR. A gate electrode of the main thin film transistor M_TR is coupled to a source line SL, a source electrode of the main thin film transistor M_TR is coupled to a data line DL, and a drain electrode of the main thin film transistor M_TR is coupled to a pixel PX and a source electrode of the sub thin film transistor S_TR. The source of the sub thin film transistor S_TR is coupled to the pixel PX and the drain electrode of the main thin film transistor M_TR, a gate electrode of the sub thin film transistor S_TR is coupled to the gate line GL, and a drain electrode of the sub thin film transistor S_TR receives a second bias voltage B2.

A data voltage applied to each of the pixels PX1_1 to PX19_2 has a first data voltage range DW1. The first data voltage range DW1 may be partially overlapped with a range defined by a gate on voltage V1 and a gate off voltage V2.

A data voltage applied to the oblique lines DG1 to DG12 and the intersectional lines GD1 to GD13 has a second data voltage range DW2. The second data voltage range DW2 may not be overlapped with a range that is defined by the gate on voltage V1 and the gate off voltage V2. For example, a lower value of the second data voltage range DW2 is greater than or equal to the gate on voltage V1, and an upper value of the second data voltage range DW2 is smaller than or equal to the gate off voltage V2. Below, it is assumed that the upper value of the second data voltage range DW2 is smaller than or equal to the gate off voltage V2. For example, the first data voltage range DW1 may be 0 V to 7 V, the second data voltage range DW2 may be −21 V to −7V, and the second bias voltage B2 may be 21 V.

The main thin film transistor M_TR and the sub thin film transistor S_TR act as resistors that have the same or substantially the same resistance value. A data voltage that is applied to the data line DL and has the second data voltage range DW2 is level shifted into the first data voltage range DW1 through the main thin film transistor M_TR and the sub thin film transistor S_TR that operate in response to a gate signal applied to the gate line GL. The level shifted voltage is applied to the pixels PX1_1 to PX19_2. For example, a data voltage applied to each pixel is divided through the main thin film transistor M_TR and the sub thin film transistor S_TR to have a voltage level between a data voltage with the second data voltage range DW2 and the second bias voltage B2. In other words, a data voltage with the first data voltage range DW1 may be obtained by dividing a sum of the second bias voltage B2 and a data voltage with the second data voltage range DW2 using the main thin film transistor M_TR and the sub thin film transistor S_TR.

During a 1st horizontal period, a first gate signal is applied to a first oblique line DG1 to drive a 1st pixel row PXR1. A 1st row data voltage with the second data voltage range DW2 is applied to a 1st intersectional line GD1. A 1st-row 1st thin film transistor TR1_1 level shifts the 1st row data voltage into a data voltage with the first data voltage range DW1 in response to the first gate signal, and the level shifted voltage is applied to the 1st-row 1st pixel PX1_1.

Afterwards, during a 2nd horizontal period, a second gate signal is applied to a 2nd oblique line DG2 to drive a 2nd-row 1st pixel PX2_1. A 2nd-row 1st data voltage with the second data voltage range DW2 is applied to the 1st oblique line DG1. Since an upper value of the second data voltage range DW2 is smaller than or equal to the gate off voltage V2, the 2nd-row 1st data voltage with the second data voltage range DW2 may not act as a gate signal of a 1st-row 1st thin film transistor TR1_1. A 2nd-row 1st thin film transistor TR2_1 level shifts a 2nd-row 1st data voltage into a data voltage with the first data voltage range DW1 in response to the second gate signal, and the level shifted voltage is applied to the 2nd-row 1st pixel PX2_1.

A thin film transistor coupled to each respective pixel of the display panel 100 includes the main thin film transistor M_TR and the sub thin film transistor S_TR, and level shifts the second data voltage range DW2 of a voltage applied to a data line DL into the first data voltage range DW1 through the main thin film transistor M_TR and the sub thin film transistor S_TR, so as to be applied to each respective pixel. Thus, a data voltage applied to a gate line GL may not be used as a gate signal.

Now will be described a charging fault of a pixel according to an embodiment of the present invention.

Returning to FIG. 3A, a display panel 100 is driven by the pixel row, so 1st to 19th horizontal periods drive the 1st to 19th pixel rows PXR1 to PXR19, respectively.

As compared with a display panel in which each gate line is coupled to the same number of pixels, the display panel 100 according to an embodiment of the present invention uses (or utilizes) more horizontal periods during a 1-frame. Therefore, a horizontal period is relatively shortened. A decrease in a horizontal period causes a reduction in a time when a data voltage is applied to each pixel according to a gate signal. Thus, brightness of an image displayed may be lowered.

Now will be described methods of solving the above-described charging fault of a pixel.

Moduration of Horizontal Period

Figure 14:
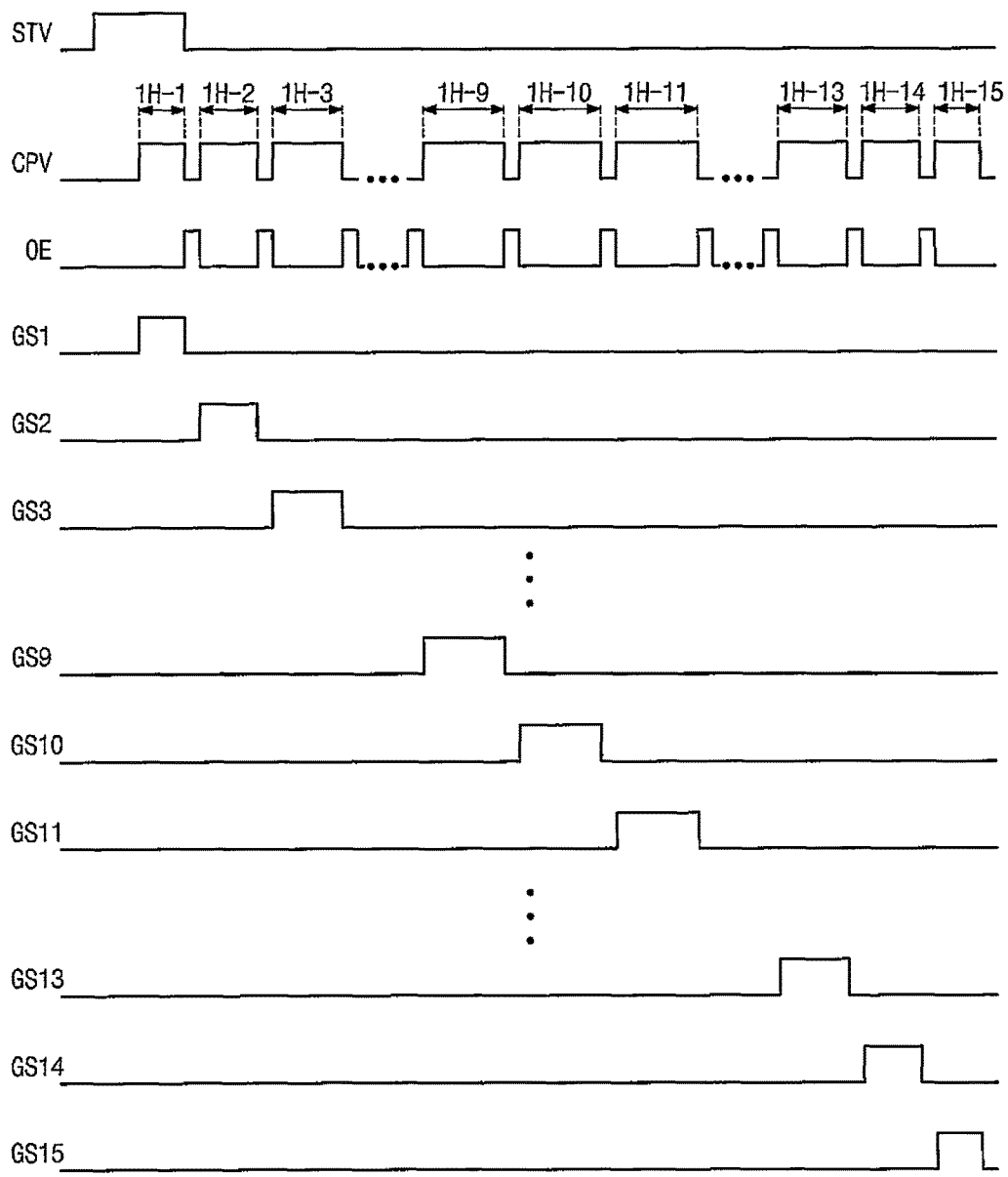
FIG. 14 is a diagram schematically illustrating input and output signals of a gate driver shown in FIG. 2 during a frame.

FIG. 14 is a diagram schematically illustrating input and output signals of a gate driver shown in FIG. 2 during a frame.

Referring to FIGS. 2, 3B, and 14, a gate driver 500 receives a vertical start signal STV, a gate clock CPV, and an output enable signal OE from a timing controller 400. When the vertical start signal STV is received, the gate driver 500 sequentially outputs gate signals GS1 to GS19 based on the output enable signal OE. The gate signals GS1 to GS19 rise in synchronization with a rising edge of the gate clock CPV and fall in synchronization with a falling edge of the gate clock CPV.

A pulse width of each of the gate signals GS1 to GS19 may be defined as a horizontal period.

The gate signals GS1 to GS19 are respectively applied during horizontal periods 1H-1 to 1H-19.

1st to 7th horizontal periods 1H-1 to 1H-7, in which 1st to 7th pixel rows PXR1 to PXR7 included in an increasing area A1 are driven, may increase gradually. In other words, the pulse widths of 1st to 7th gate signals GS1 to GS7 may increase sequentially. Since the number of pixels in each pixel row increases in an arithmetic sequence toward the 7th pixel row PXR7 from the 1st pixel row PXR1, pulse widths of the 1st to 7th gate signals GS1 to GS7 may increase in an arithmetic sequence.

That the number of pixels included in a pixel row increases toward the 7th pixel row PXR7 from the 1st pixel row PXR1 may mean that an RC delay value increases. As a horizontal period increases toward the 7th pixel row PXR7 from the 1st pixel row PXR1, a charging fault due to a difference among RC delay values of the 1st to 7th pixel rows PXR1 to PXR7 is reduced or prevented.

8th to 12th horizontal periods 1H-8 to 1H-12, in which 8th to 12th pixel rows PXR8 to PXR12 included in a maintaining area A2 are driven, may be the same. In other words, 8th to 12th gate signals GS8 to GS12 may have the same pulse width.

An RC delay value of each of the 8th to 12th pixel rows PXR8 to PXR12 included in the maintaining area A2 is greater than an RC delay value of each of the 1st to 7th pixel rows PXR1 to PXR7 included in the increasing area A1 and an RC delay value of each of the 13th to 19th pixel rows PXR13 to PXR19 included in a decreasing area A3. Thus, a pulse width of each of the 8th to 12th gate signals GS8 to GS12 applied to the 8th to 12th pixel rows PXR8 to PXR12 included in the maintaining area A2 may be wider than that of each of the 1st to 7th gate signals GS1 to GS7 applied to the 1st to 7th pixel rows PXR1 to PXR7 included in the increasing area A1 and that of each of the 13th to 19th gate signals GS13 to GS19 applied to the 13th to 19th pixel rows PXR13 to PXR19 included in the decreasing area A3.

13th to 19th horizontal periods 1H-13 to 1H-19, in which 13th to 19th pixel rows PXR13 to PXR19 included in the decreasing area A3 are driven, may decrease gradually. In other words, pulse widths of 13th to 19th gate signals GS13 to GS19 may decrease sequentially. Since the number of pixels in each pixel row decreases in an arithmetic sequence toward the 19th pixel row PXR19 from the 13th pixel row PXR13, pulse widths of the 13th to 19th gate signals GS13 to GS19 may decrease in an arithmetic sequence.

That the number of pixels included in a pixel row decreases toward the 19th pixel row PXR19 from the 13th pixel row PXR13 may mean that an RC delay value decreases. As a horizontal period decreases toward the 19th pixel row PXR19 from the 13th pixel row PXR13, a charging fault due to a difference among RC delay values of the 13th to 19th pixel rows PXR13 to PXR19 is reduced or prevented.

Considering a display panel 100 including the increasing area A1, the maintaining area A2, and the decreasing area A3, a horizontal period may be adjusted according to the number of pixels in each pixel row. As compared with a display panel in which each gate line is coupled to the same number of pixels, it is possible to solve the phenomenon that a horizontal period becomes short.

Division of Display Panel into Two Independently Driven Areas

Figure 15:
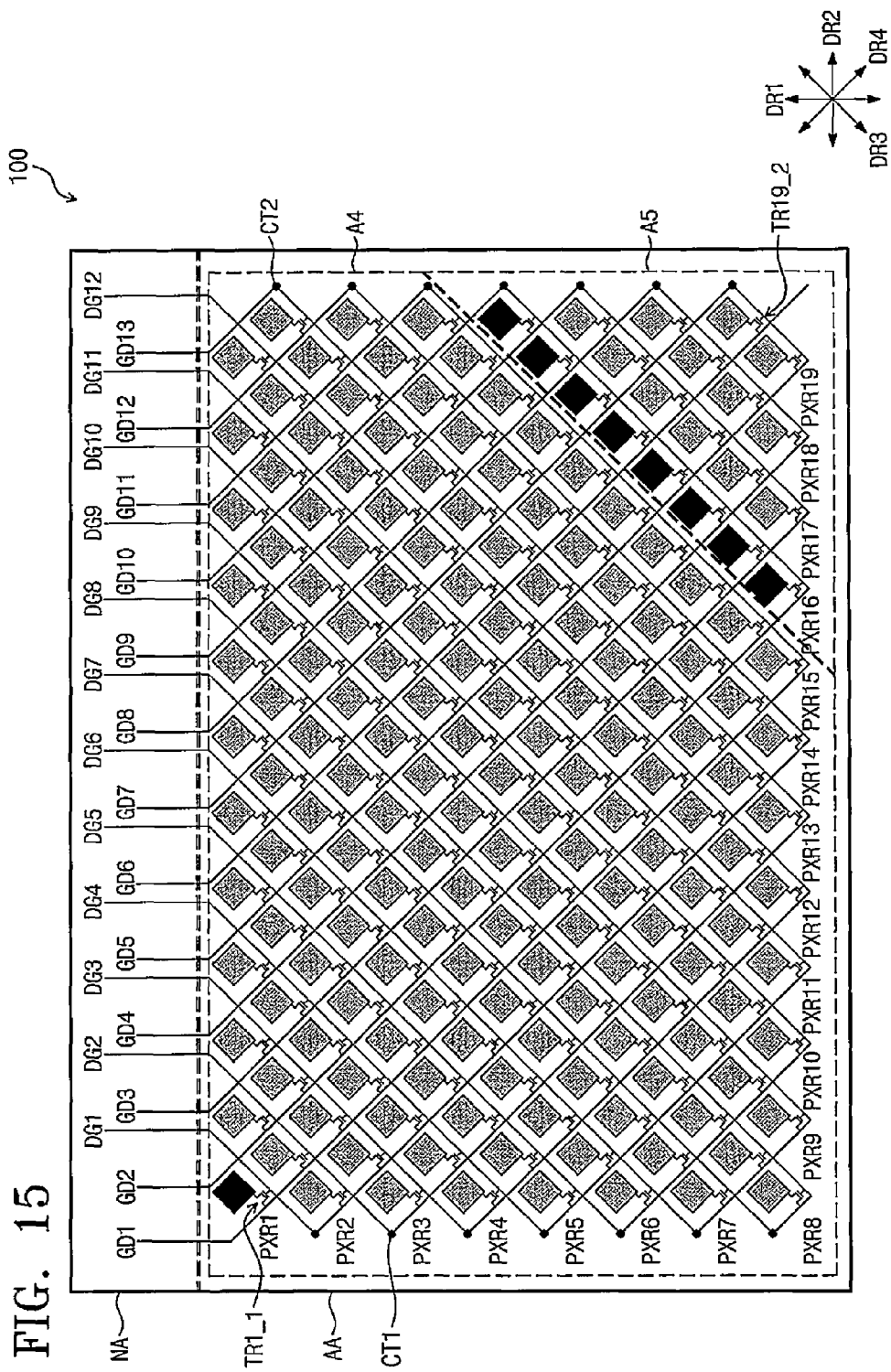
FIG. 15 is a diagram schematically illustrating a display panel 100 that is divided into a main area and a sub area.
Figure 16:
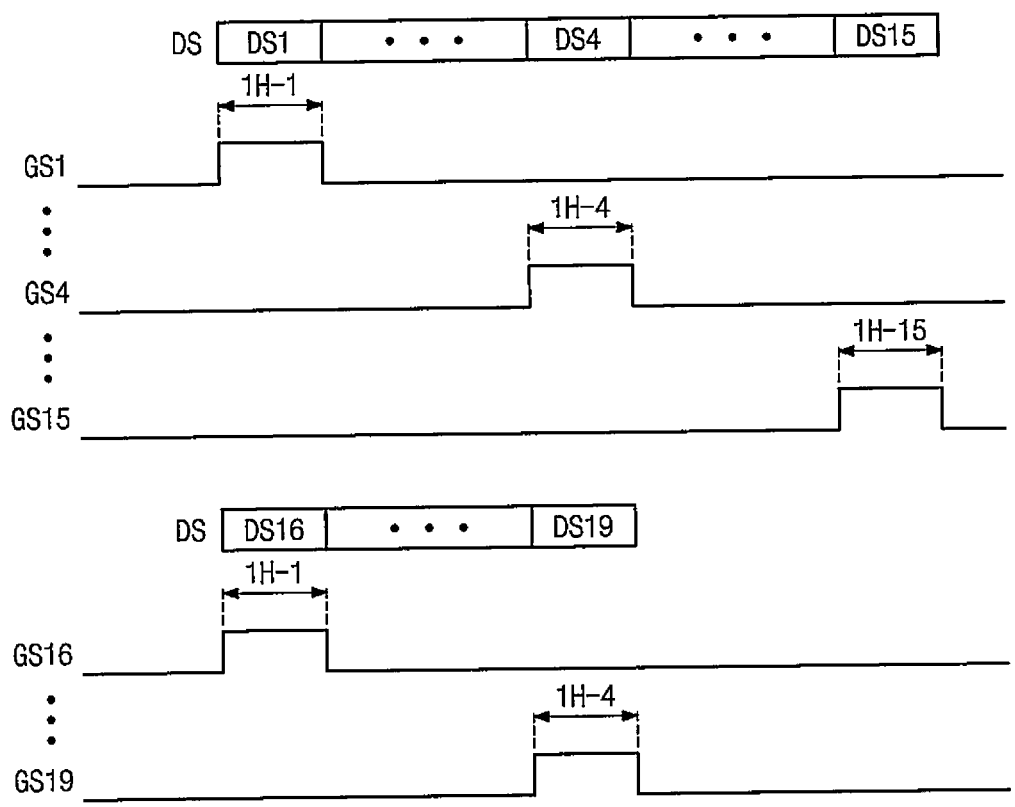
FIG. 16 is a diagram schematically illustrating gate signals and row data voltages DS applied to a display panel 100 shown in FIG. 15.

FIG. 15 is a diagram schematically illustrating a display panel 100 that is divided into a main area and a sub area. FIG. 16 is a diagram schematically illustrating gate signals GS1 to GS19 and row data voltages DS applied to a display panel 100 shown in FIG. 15.

Referring to FIG. 15, a display panel 100 includes a main area A4 and a sub area A5.

The main area A4 includes pixel rows that are coupled to at least one of two lines coupled to a 1st pixel row PXR1 driven during a 1st horizontal period, from among oblique lines DG1 to DG12 and intersectional lines GD1 to GD13. For example, the main area A4 includes pixel rows coupled to at least one of the 1st oblique line DG1 and the intersectional line GD1 coupled to the 1st pixel row PXR1 driven during the 1st horizontal period.

The sub area A5 includes pixel rows that are not coupled to the two lines. In detail, the sub area A5 includes pixel rows that are not coupled to the 1st oblique line DG1 and the first intersectional line GD1 coupled to the 1st pixel row PXR1.

In example embodiments, the main area A4 includes 1st to 15th pixel rows PXR1 to PXR15, and the sub area A5 includes 16th to 19th pixel rows PXR16 to PXR19. For example, the 1st pixel row PXR1 is coupled to the 1st oblique line DG1 and the 1st intersectional line GD1, and the 2nd to 15th pixel rows PXR2 to PXR15 are coupled to the 1st oblique line DG1 and/or the 1st intersectional line GD1. In contrast, the 16th to 19th pixel rows PXR11 PXR19 are not coupled to the 1st oblique line DG1 and/or the 1st intersectional line GD1. Since the 1st pixel row PXR1 and the 16th pixel row PXR16 receive a data voltage and a gate signal via different oblique lines and intersectional lines, they may be driven independently and during the same horizontal period.

The main area A4 and the sub area A5 may be driven independently within the same frame.

The 1st to 15th pixel rows PXR1 to PXR15 included in the main area A4 are driven sequentially during a frame, and the 16th to 19th pixel rows PXR16 to PXR19 included in the sub area A5 are driven sequentially during a part of the frame. For example, both a pixel row in the main area A4 and a pixel row included in the sub area A5 that are driven during the same horizontal period receive a data voltage and a gate signal via different lines. The 1st pixel row PXR1 included in the main area A4 and the 16th pixel row PXR16 included in the sub area A5 may be driven during the same horizontal period.

Referring to FIGS. 15 and 16, during a 1st horizontal period 1H-1, a 1st gate signal GS1 is applied to the 1st oblique line DG1 and a 1st row data voltage DS1 is applied to the 1st intersectional line GD1. At this time, the 1st pixel row PXR1 is driven. Also, during the 1st horizontal period 1H-1, the 16th gate signal GS16 is applied to the 10th intersectional line GD10 and the 16th row data voltage DS16 is applied to 2nd to 9th intersectional lines GD2 to GD9. At this time, the 16th pixel row PXR16 is driven.

After the 2nd and 3rd pixel rows PXR2 and PXR3 and the 17th and 18th pixel rows PXR17 and PXR18 are sequentially driven, during a 4th horizontal period 1H-4, the 4th and 19th pixel rows PXR4 and PXR19 are driven. All pixel rows included in the sub area A5 may be driven during the 1st to 4th horizontal periods 1H-1 to 1H-4.

After the 5th to 14th pixel rows PXR5 to PXR14 are driven sequentially, during the 15th horizontal period 1H-15, the 15th pixel row PXR15 is driven. All pixel rows included in the main area A4 may be driven during the 1st to 15th horizontal periods 1H-1 to 1H-15.

19 horizontal periods are used (e.g., utilized) when the 1st to 19th pixel rows PXR1 to PXR19 are driven sequentially during one frame as described with reference to FIG. 14. However, according to the example embodiment described with reference to FIGS. 15 and 16, as pixel rows that receive a data voltage and a gate signal via different lines are driven during the same horizontal period, the 1st to 19th pixel rows PXR1 to PXR19 are driven during one frame using (or utilizing), for example, 15 horizontal periods. Thus, as compared with the embodiment with reference to FIG. 14, a horizontal period is elongated relatively and the above-described problem such as a charging fault is reduced or prevented.

In FIGS. 15 and 16, there is illustrated an example where the sub area A5 includes the 16th to 19th pixel rows PXR16 to PXR19. However, the present invention is not limited thereto. For example, the sub area A5 may include one of pixel rows, which are not coupled to an oblique line and/or an intersectional line coupled to the 1st pixel row PXR1, or the 19th pixel row PXR19.

The 17th pixel row PXR17 may be driven during the 1st or 2nd horizontal period if the sub area A5 includes the 17th to 19th pixel rows PXR17 to PXR19.

Now will be described a structure in which a gate signal and a data voltage are applied selectively to an oblique line or an intersectional line.

Figure 17:
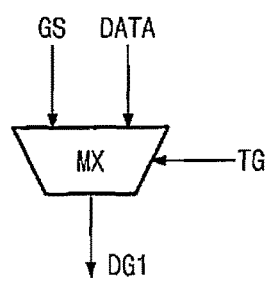
FIG. 17 is a diagram schematically illustrating a multiplexer coupled to a 1st oblique line.

FIG. 17 is a diagram schematically illustrating a multiplexer coupled to a 1st oblique line.

Referring to FIGS. 2, 3A, and 17, a display device 1000 of an embodiment of the present invention includes a multiplexer MX. The multiplexer MX is coupled (e.g., connected) to each oblique line DG and each intersectional line GS. However, the present invention is not limited thereto. For example, the multiplexer MX is coupled to each of oblique hybrid lines DG1 to DG7 and intersectional hybrid lines GD7 to GD13, but the multiplexer MX is not coupled to each of oblique gate lines DG8 to DG12 and intersectional data lines GD1 to GD6.

In FIG. 17, there is illustrated an example in which the multiplexer MX is coupled to a 1st oblique line DG1. Multiplexers coupled to 2nd to 12th oblique lines DG2 to DG12 and 1st to 13th intersectional lines GD1 to GD13 may be configured the same or substantially the same as the multiplexer MX coupled to the 1st oblique line DG1.

The multiplexer MX receives a gate signal GS from the gate driver 500 and a data voltage DATA from a data driver 600. The multiplexer MX selectively outputs one of the gate signal GS and the data voltage DATA according to a multiplexer control signal TG.

The multiplexer MX may be provided at a non-display area NA of the display panel 100. However, the present invention is not limited thereto. For example, the multiplexer MX may be included on an integrated circuit chip in which the gate driver 500 and the data driver 600 are integrated.

Figure 18:
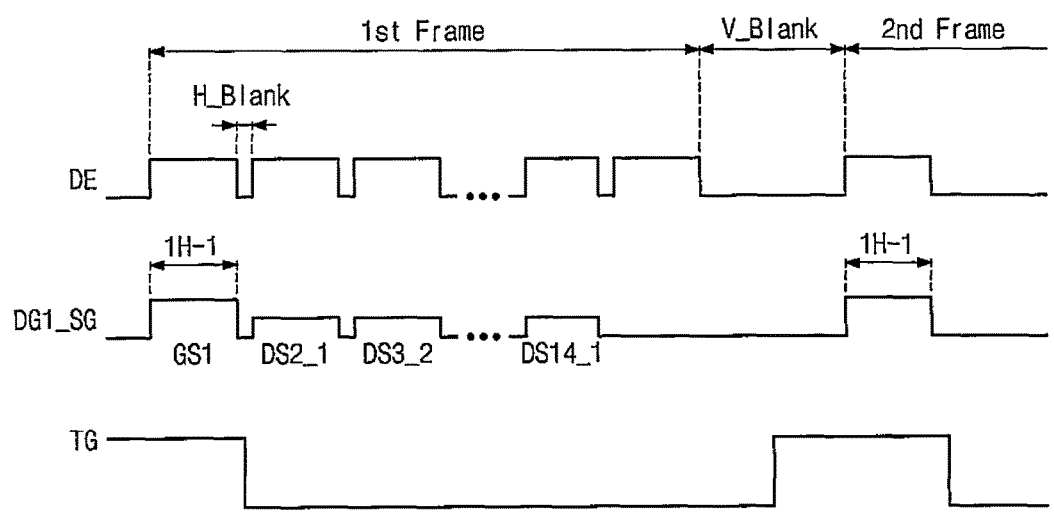
FIG. 18 is a timing diagram schematically illustrating a multiplexer control signal applied to a multiplexer shown in FIG. 17, a data enable signal, and a signal applied to a 1st oblique line.

FIG. 18 is a timing diagram schematically illustrating a multiplexer control signal TG applied to a multiplexer shown in FIG. 17, a data enable signal DE, and a signal DG1_SG applied to a 1st oblique line DG1.

The data enable signal DE is a signal that is applied to a data driver 500 from a timing controller 400. The data voltage DATA is output by the row data voltage in synchronization with a high period of the data enable signal DE. A low period of the data enable signal DE is a period where a data voltage is not output and is defined as a horizontal blank period H_Blank.

An image corresponding to a screen is all displayed during a frame, and a vertical blank period V_Blank is defined between two sequential (e.g., successive) frames. In FIG. 18, there are illustrated first and second frames, which are sequential (e.g., successive), and the vertical blank period V_Blank between the first and second frames.

A low-to-high transition or a high-to-low transition of the multiplexer control signal TG may be made during the horizontal blank period H_Blank or the vertical blank period V_Blank. In the description below, it is assumed that the multiplexer MX outputs the gate signal GS during a high period of the multiplexer control signal TG, and the data voltage DATA during a low period of the multiplexer control signal TG. However, the present invention is not limited thereto. For example, the multiplexer MX may output the data voltage DATA during a high period of the multiplexer control signal TG, and the gate signal GS during a low period of the multiplexer control signal TG.

Since the multiplexer control signal TG has a high period during a 1st horizontal period 1H-1 of the first frame, a 1st gate signal GS1 is output from the multiplexer MX to a 1st oblique line DG1. Before a 1st row data voltage is output and a 2nd-row 1st data voltage DS2_1 is applied, the multiplexer control signal TG transitions from a high level to a low level during the horizontal blank period H_Blank. The multiplexer control signal TG has a low period after a 2nd horizontal period of the first frame, so a 2nd-row 1st data voltage DS2_1 to a 14th-row 1st data voltage DS14_1 may be applied to the 1st oblique line DG1 via the multiplexer MX.

The multiplexer control signal TG transitions from a low level to a high level during the vertical blank period V_Blank between the first and second frames. Afterwards, the multiplexer control signal TG has a high period during a 1st horizontal period 1H-1 of the second frame. Thus, the 1st gate signal GS1 is applied to the 1st oblique line DG1 via the multiplexer MX.

Because the multiplexer control signal TG is switched between a low level and a high level during the horizontal blank period H_Blank or the vertical blank period V_Blank, it may not affect a waveform of the data voltage DATA. Thus, the above-describe problem such as a data voltage charging fault does not occur, even though the gate signal GS and the data voltage DATA are selectively applied to an oblique line DG or an intersectional line GD via the multiplexer MX.

Figure 19:
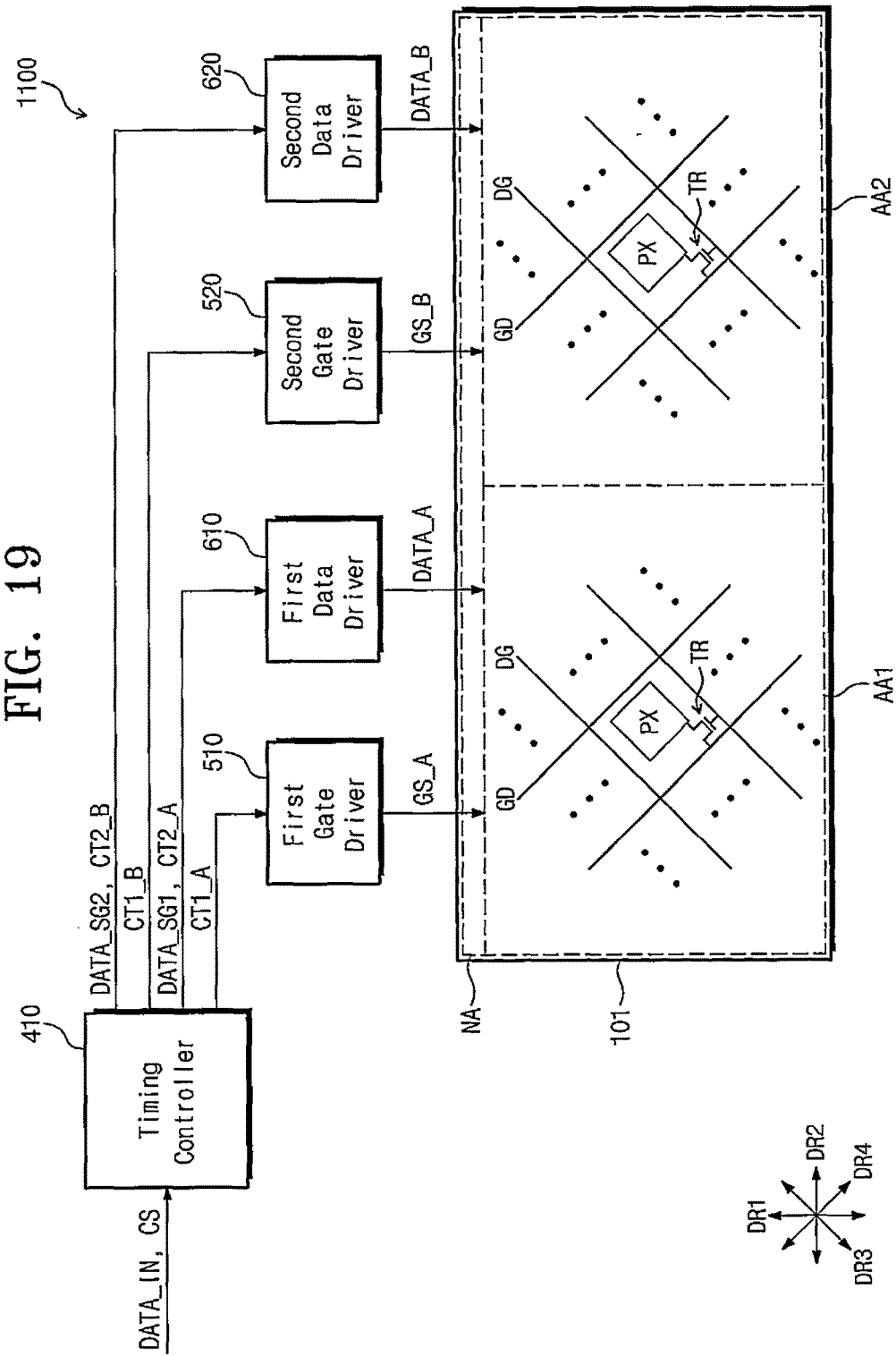
FIG. 19 is a block diagram schematically illustrating a display device 1100 according to another embodiment of the present invention.

FIG. 19 is a block diagram schematically illustrating a display device 1100 according to another embodiment of the present invention.

A display device 1100 shown in FIG. 19 is substantially the same as that shown in FIG. 2, except for the following differences. The display device 1100 includes a plurality of display areas that are driven independently. Now will be described the differences between the display device 1100 shown in FIG. 19 and a display device 1000 shown in FIG. 2.

Referring to FIG. 19, the display device 1100 includes a display panel 101, a timing controller 410, a first gate driver 510, a second gate driver 520, a first data driver 610, and a second data driver 620.

The display panel 101 encompasses a first display area AA1, a second display area AA2, and a non-display area NA. Each of the first display area AA1 and the second display area AA2 displays images. The non-display area NA is an area where an image is not displayed. The non-display area NA may be adjacent to one side of a first direction DR1 of the first display area AA1 and the second display area AA2.

The first display area AA1 and the second display area AA2 are driven separately. The first display area AA1 and the second display area AA2 are adjacent to each other. Each of the first display area AA1 and the second display area AA2 is substantially the same as a display area AA shown in FIG. 3A. Each of the first display area AA1 and the second display area AA2 includes oblique lines and intersectional lines that are crossed (e.g., intersected) and isolated from each other. A detailed description of the first display area AA1 and the second display area AA2 is omitted.

The timing controller 410 receives an input image signal DATA_IN and a control signal CS from an external graphics controller.

The timing controller 410 generates a first gate control signal CT1_A, a second gate control signal CT1_B, a first data control signal CT2_A, and a second data control signal CT2_B in response to the control signal CS.

The timing controller 410 converts the input image signal DATA_IN into a first data signal DATA_SG1 and a second data signal DATA_SG2 to be suitable for the specification of the first data driver 610 and the second data driver 620, and outputs the first and second data signals DATA_SG1 and DATA_SG2 to the first and second data drivers 610 and 620, respectively.

The first gate control signal CT1_A may be a gate control signal for controlling an operation of the first gate driver 510, and the second gate control signal CT1_B may be a gate control signal for controlling an operation of the second gate driver 520.

The first data control signal CT2_A may be a data control signal for controlling an operation of the first data driver 610, and the second data control signal CT2_B may be a data control signal for controlling an operation of the second data driver 620.

The first gate driver 510 generates first area gate signals GS_A based on the first gate control signal CT1_A, and provides the first area gate signals GS_A to oblique lines and intersectional lines that are included in the first display area AA1.

The second gate driver 520 generates second area gate signals GS_B based on the second gate control signal CT1_B, and provides the second area gate signals GS_B to oblique lines and intersectional lines that are included in the second display area AA2.

The first data driver 610 outputs a first area data voltage DATA_A, obtained by converting the first data signal DATA_SG1, to the oblique lines and the intersectional lines of the first display area AA1, based on the first data control signal CT2_A.

The second data driver 620 outputs a second area data voltage DATA_B, obtained by converting the second data signal DATA_SG2, to the oblique lines and the intersectional lines of the second display area AA2, based on the second data control signal CT2_B.

With the display device 1100 shown in FIG. 19, although a display panel 101 includes two display areas AA1 and AA2 that are driven independently, a non-display area of a second direction DR2 between the display areas AA1 and AA2 is minimized or removed. FIG. 19 shows an example where the display panel 101 includes two display areas AA1 and AA2. However, the present invention is not limited thereto. For example, the display panel 101 may include three or more display areas that are adjacent along the second direction DR2.

Figure 20:
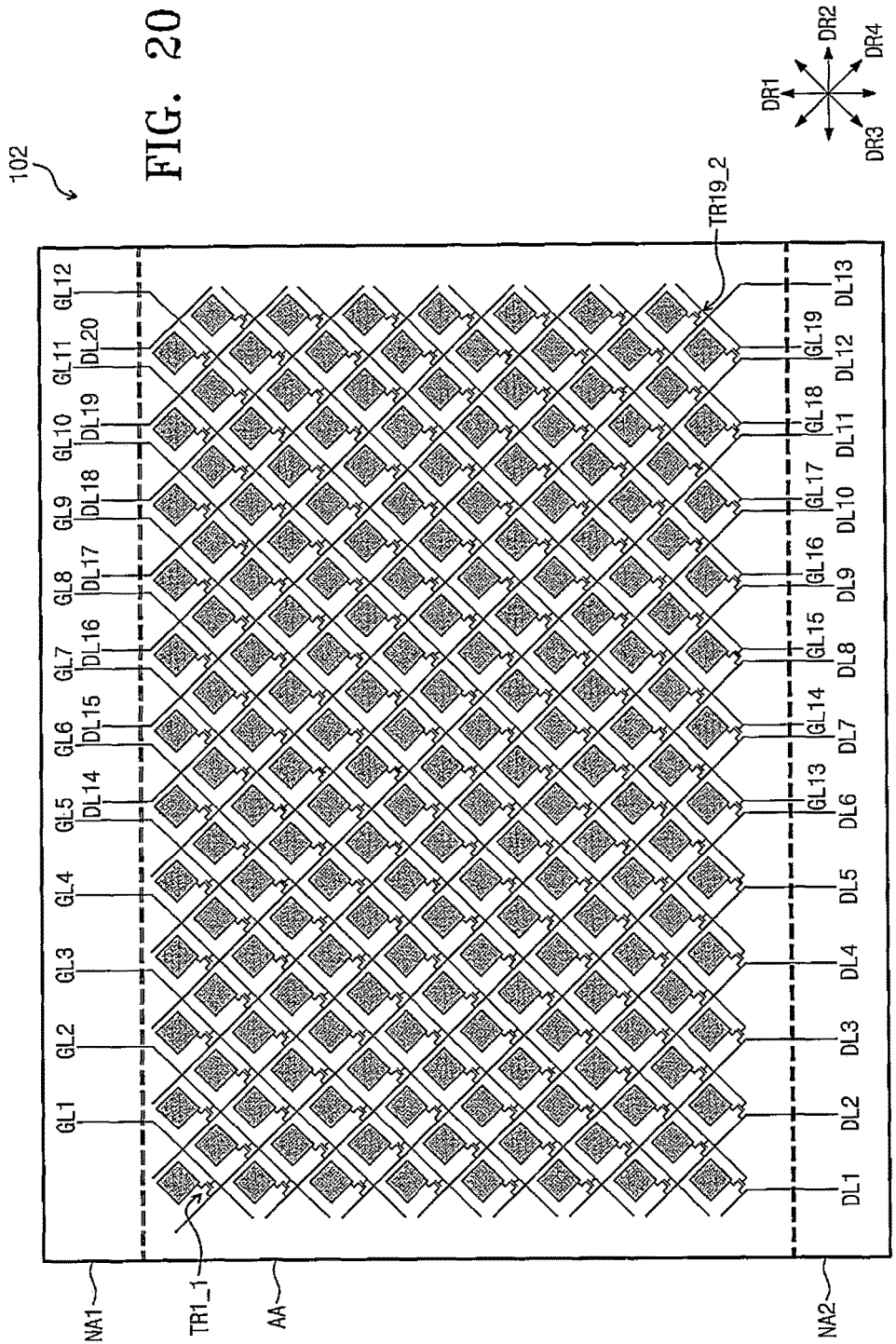
FIG. 20 is a diagram schematically illustrating a display panel of a display device according to another embodiment of the present invention.

FIG. 20 is a diagram schematically illustrating a display panel of a display device according to another embodiment of the present invention.

Now will be described differences between a display panel 102 shown in FIG. 20 and a display panel 100 shown in FIG. 3A. Portions that are not described may be the same or substantially the same as the display panel 100 shown in FIG. 3A.

Referring to FIGS. 2 and 20, the display panel 102 includes a display area AA, a first non-display area NA1, and a second non-display area NA2. The display area AA displays images and includes gate lines GL, data lines DL, and pixels PX.

The first non-display area NA1 and the second non-display area NA2 are areas where images are not displayed and are formed at a periphery of the display panel 102. The first non-display area NA1 and the second non-display area NA2 are opposite to each other in a first direction DR1, with the display area AA interposed therebetween.

The first non-display area NA1 may include a first pad portion, and the second non-display area NA2 may include a second pad portion. The first and second pad portions are coupled (e.g., connected) to the gate lines and the data lines to provide the gate lines and the data lines with a gate signal from a gate driver 500 (refer to FIG. 2) and a data voltage from a data driver 600 (refer to FIG. 2).

The gate lines GL and the data lines DL may extend in an oblique direction with respect to a first direction DR1 and a second direction DR2. That the gate lines GL and the data lines DL extend in the oblique direction may mean not only that they extend in a straight-line shape but also that they extend in a zigzag shape and the extending direction is the oblique direction.

When viewed from the top, the gate lines GL extend in a third direction DR3 and the data lines DL extend in a fourth direction DR4. The gate lines GL and the data lines DL are disposed at different layers with an insulation material interposed therebetween for isolation.

The gate lines include 1st to 19th gate lines GL1 to GL19, which are spaced apart from one another in the fourth direction DR4. Each of the 1st to 19th gate lines GL1 to GL19 is coupled to a gate electrode of each thin film transistor coupled to a pixel row. For example, the 1st gate line GL1 is coupled to a 1st-row 1st thin film transistor coupled to a 1st-row 1st pixel PX1_1, the 2nd gate line GL2 is coupled to 2nd-row thin film transistors coupled to a 2nd pixel row PX2, and the 19th gate line GL19 is coupled to 19th-row thin film transistors coupled to a 19th pixel row PX19.

The data lines DL include 1st to 20th data lines DL1 to DL20, which are spaced apart from one another in a third direction DR3. The 1st to 20th data lines DL1 to DL20 are coupled to source electrodes of thin film transistors TR1_1 to TR19_2 coupled to pixels PX1_1 to PX19_2, respectively.

The gate lines GL1 to GL19 are formed of upper gate lines GL1 to GL12 and lower gate lines GL13 to GL19. Also, the data lines DL1 to DL20 are formed of upper data lines DL8 to DL20 and lower data lines DL1 to DL7.

The pixels PX are provided at pixel areas that are defined by the gate lines GL and the data lines DL. Shapes of the pixels PX viewed from the top may be decided variously according to shapes of the gate lines GL and the data lines DL. For example, in FIG. 20, the pixels PX have a diamond shape.

The number of pixels in one of two adjacent pixel rows is different from the number of pixels in the other thereof.

The upper gate lines GL1 to GL12 and the upper data lines DL8 to DL20 may be coupled at the first pad portion. The first pad portion may provide a part of gate signals GS from a gate driver 500 (refer to FIG. 2) and a part of data voltages DATA from a data driver 600 (refer to FIG. 2) to the upper gate lines GL1 to GL12 and the upper data lines DL8 to DL20.

The lower gate lines GL13 to GL19 and the lower data lines DL1 to DL7 may be coupled at the second pad portion. The second pad portion may provide the remaining gate signals GS from the gate driver 500 and the remaining data voltages DATA from the data driver 600 to the lower gate lines GL13 to GL19 and the lower data lines DL1 to DL7.

When compared with a display panel 100 shown in FIG. 3A, a display panel 102 shown in FIG. 20 does not include a contact portion. Thus, the gate lines GL and the data lines DL are not interconnected at a point where they are overlapped when viewed from the top.

With a display device including the display panel 102 of FIG. 20, gate signals are provided to the gate lines GL and data voltages are provided to the data lines DL. Thus, it is possible to fundamentally prevent or reduce a problem described with reference to FIGS. 7 and 8.

Figure 21:
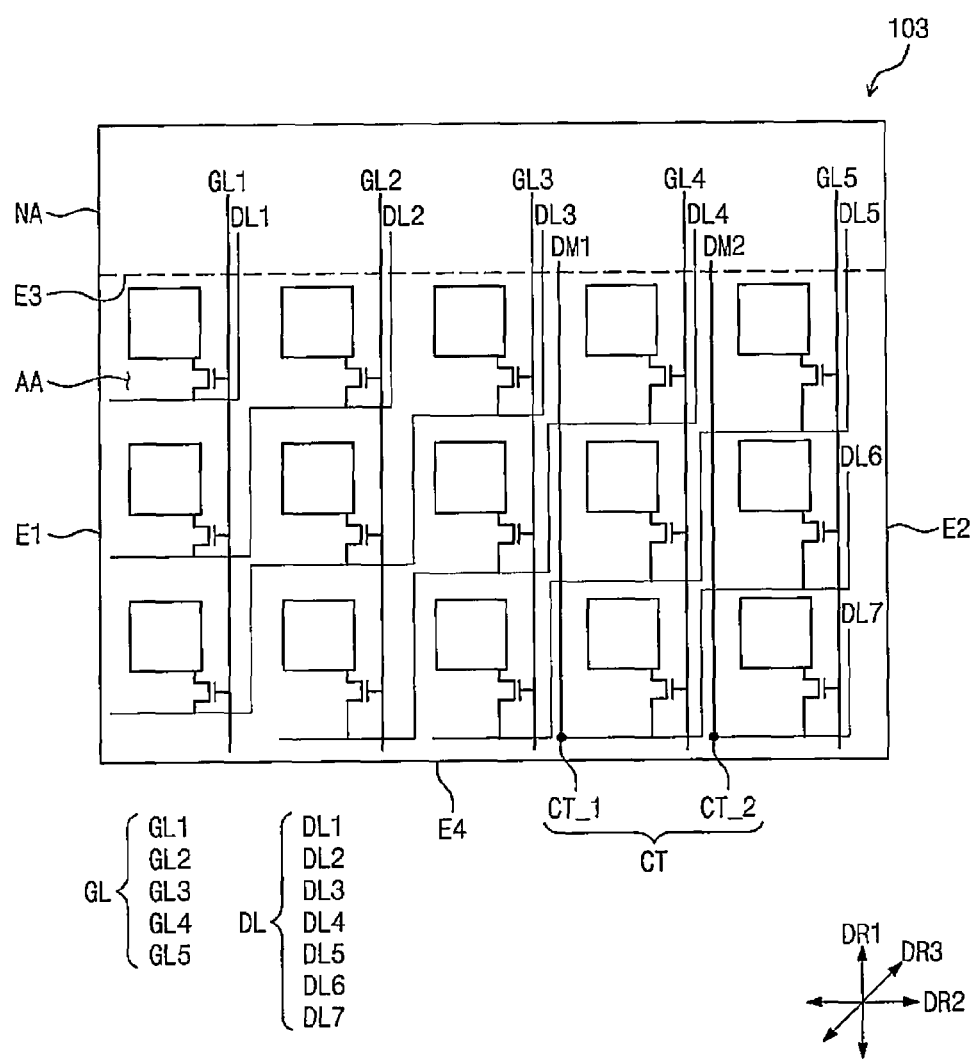
FIG. 21 is a diagram schematically illustrating a display panel of a display device according to another embodiment of the present invention.

FIG. 21 is a diagram schematically illustrating a display panel of a display device according to another embodiment of the present invention. FIG. 22 is a diagram schematically illustrating pixels shown in FIG. 21.

Now will be described differences between a display panel 103 shown in FIG. 21 and a display panel 100 shown in FIG. 3A. Portions that are not described may be the same or substantially the same as the display panel 100 shown in FIG. 3A.

Referring to FIGS. 2, 20, and 21, the display panel 103 includes a display area AA and a non-display area NA. The display area AA displays images and includes gate lines GL, data lines DL, and pixels PX. The display area AA may further comprise first to fourth edges E1 to E4. The first and second edges E1 and E2 may extend in the first direction DR1. The third and fourth edges E3 and E4 may extend in the second direction DR2. The display panel 103 may further comprise a substrate, The substrate may be divided into the display area AA and the non-display area NA when viewed from a top.

The non-display area NA is area where images are not displayed and is formed at a periphery of the display panel 103. The non-display area NA is adjacent to one side of a first direction DR1 of the display area AA. The non-display area NA may include a pad portion. The pad portion is coupled (e.g., connected) to the gate lines and the data lines to provide the gate lines and the data lines with a gate signal from a gate driver 500 (refer to FIG. 2) and a data voltage from a data driver 600 (refer to FIG. 2).

The gate lines GL may extend in a first direction DR1, and the data lines DL may extend in an oblique direction with respect to the first direction DR1 and a second direction DR2. That the data lines DL extend in the oblique direction may mean not only that they extend in a straight-line shape but also that they extend in a zigzag shape and the extending direction is the oblique direction.

In FIG. 21, there is illustrated an example where the data lines DL extend along the first direction DR1 and the second direction DR2 in a zigzag shape. An extending direction of the data lines DL is defined as a third direction DR3. The gate lines GL and the data lines DL are disposed at different layers with an insulation material interposed therebetween for isolation.

However, the present invention is not limited thereto and according to another embodiment of the inventive concept, the data lines DL may extend in a first direction DR1, The gate lines GL may extend along the first direction DR1 and the second direction DR2 in a zigzag shape. The gate lines GL include 1st to 5th gate lines GL1 to GL5, which are spaced apart from one another in a second direction DR2. The data lines DL include 1st to 7th data lines DL1 to DL7.

The pixels PX are disposed at pixel areas that are defined by the 1st to 5th gate lines GL1 to GL5 and 1st to 7th data lines DL1 to DL7. Shapes of the pixels PX viewed from the top may be decided variously according to shapes of the gate lines GL and the data lines DL. For example, in FIGS. 21 and 22, the pixels PX are arranged in a matrix form according to the first direction DR1 and the second direction DR2.

The gate lines GL are coupled to the same number of pixels, respectively.

Pixels, coupled to a gate line GL and a data line DL, from among the pixels PX may be defined as a pixel row. It is assumed that a pixel row is formed of pixels coupled to a data line DL. The pixel row includes 1st to 7th pixel rows PXR1 to PXR7.

The number of pixels in one of two adjacent pixel rows may be different from that in the other thereof. The display area AA is divided into three areas by the pixel rows, based on whether the number of pixels in each pixel row increases, is maintained, or decreases on the basis of adjacent pixel rows. The three areas may include an increasing area A1, a maintaining area A2, and a decreasing area A3.

The increasing area A1 includes 1st and 2nd pixel rows PXR1 and PXR2. The number of pixels in each pixel row may increase in an arithmetic sequence in every at least one pixel row toward the 2nd pixel row PXR2 from the 1st pixel row PXR1.

The maintaining area A2 includes 3rd to 5th pixel rows PXR3 to PXR5, which include the same number of pixels in each row.

The decreasing area A3 includes 6th and 7th pixel rows PXR6 to PXR7. The number of pixels in each pixel row may decrease in an arithmetic sequence in every at least one pixel row toward the 7th pixel row PXR7 from the 6th pixel row PXR6.

The display panel 103 further comprises dummy lines DM1 and DM2 and a contact portion CT.

The dummy lines DM1 and DM2 extend in a direction parallel with gate lines GL.

The contact portion CT may be disposed between a periphery edge and pixels most adjacent to the periphery edge. The periphery edge comprises at least one of the first edge E1, the second edge E2, and the fourth edge E4 of display area AA. In FIG. 21, there is illustrated an example where the periphery edge is consist of the fourth edge E4.

A contact portion CT couples data lines DL6 and DL7, which are included in the decreasing area A3, and the dummy lines DM1 and DM2. Here, the data lines DL6 and DL7 and the dummy lines DM1 and DM2 are overlapped at one end of the first direction DR1 of the display area AA when viewed from the top.

The number of contact portions CT and the number of dummy lines may be the same as the number of the data lines DL6 and DL7 included in the decreasing area A3.

For example, the contact portion CT includes a first contact portion CT_1 and a second contact portion CT_2. The first contact portion CT_1 interconnects the dummy line DM1 and the 6th data line DL6, and the second contact portion CT_2 interconnects the dummy line DM2 and the 7th data line DL7.

The dummy lines DM1 and DM2 are spaced apart from gate lines GL in the second direction DR2 and are disposed at the same layer as the gate lines GL. Since the dummy lines DM1 and DM2 are disposed at a layer different from the data lines DL4, DL5, and DL6, the dummy lines DM1 and DM2 may be isolated from the data lines DL4, DL5, and DL6.

One ends of the dummy lines DM1 and DM2 are coupled to the contact portion CT, and the other ends thereof are disposed within the non-display area NA. The other ends of the dummy lines DM1 and DM2 may be coupled to a pad portion. The dummy lines DM1 and DM2 receive a part of data voltages DATA that are provided from a data driver 600 (refer to FIG. 2) via the pad portion.

While the present invention has been described with reference to example embodiments, it will be apparent to those skilled in the art that various changes and modifications may be made without departing from the spirit and scope of the present invention. Therefore, it should be understood that the above embodiments are not limiting, but illustrative. Accordingly, it will be understood by those of skill in the art that various changes in form and details may be made without departing from the spirit and scope of the present invention as set forth in the following claims, and their equivalents.

What is claimed is:

1. A display device comprising:
    a display panel comprising a display area configured to display an image and a non-display area adjacent to one side of the display area, the display area comprising oblique lines, intersectional lines crossing and isolated from at least a part of the oblique lines, and pixels, wherein pixels being coupled to one of the oblique lines or one of the intersectional lines and arranged along a line in one direction are defined into pixel rows;
    a timing controller configured to receive a control signal and an input image signal, and to output a first control signal, a second control signal, and a data signal;
    a gate driver configured to generate a gate signal based on the first control signal, and to output the gate signal to the oblique lines and the intersectional lines via the non-display area; and
    a data driver configured to output a data voltage, obtained by converting the data signal, to the oblique lines and the intersectional lines via the non-display area in response to the second control signal,
    wherein the display area further comprises a plurality of areas divided by the pixel rows being successive, and the number of pixels constituting one of adjacent ones of the pixel rows in at least one of the plurality of areas is different from the number of pixels constituting another thereof.

2. The display device of claim 1, wherein the display panel has two adjacent edges extending in first and second directions that are different from each other,
    wherein the oblique lines extend in a third direction, crossing the first and second directions, at one end of the display area adjacent to the non-display area, and
    wherein the intersectional lines extend in a fourth direction, crossing the first, second, and third directions, at the one end of the display area.

3. The display device of claim 2, wherein each of the oblique lines and the intersectional lines comprises at least one of gate lines extending in the third direction and data lines isolated from the gate lines and extending in the fourth direction.

4. The display device of claim 3, wherein the display panel further comprises:
    a contact portion coupling the gate lines and the data lines that are overlapped at both ends of the second direction of the display area when viewed from a top.

5. The display device of claim 4, wherein the contact portion comprises:
    a first contact portion at one end of the second direction of the display area; and
    a second contact portion at another end of the second direction of the display area.

6. The display device of claim 5, wherein the oblique lines comprise oblique hybrid lines comprising gate lines and data lines interconnected by the first contact portion, and oblique gate lines comprising a part of the gate lines, and
    wherein the intersectional lines comprise intersectional hybrid lines comprising gate lines and data lines interconnected by the second contact portion, and intersectional data lines comprising a part of the data lines.

7. The display device of claim 6, wherein the gate signal and the data voltage are applied to the oblique hybrid lines and the intersectional hybrid lines.

8. The display device of claim 6, wherein a data voltage applied to a data line of each of the oblique hybrid lines and the intersectional hybrid lines has a first data voltage range, and a data voltage applied to a gate line of each of the oblique hybrid lines and the intersectional hybrid lines has a second data voltage range different from the first data voltage range.

9. The display device of claim 8, wherein the second data voltage range is not overlapped with a range defined by a gate on voltage and a gate off voltage of the gate signal.

10. The display device of claim 1, wherein the plurality of areas comprise:
    an increasing area in which the number of pixels constituting each pixel row increases every pixel row;
    a maintaining area in which the number of pixels constituting each pixel row is equal to one another; and
    a decreasing area in which the number of pixels constituting each pixel row decreases every pixel row.

11. The display device of claim 10, wherein pulse widths of gate signals applied to the pixel rows of the increasing area sequentially increase at least step by step, pulse widths of gate signals applied to the pixel rows of the decreasing area sequentially decrease at least step by step, and pulse widths of gate signals applied to the pixel rows of the maintaining area are equal to one another.

12. The display device of claim 10, wherein pulse widths of gate signals applied to the pixel rows of the maintaining area are wider than pulse widths of gate signals applied to the pixel rows of the increasing area and pulse widths of gate signals applied to the pixel rows of the decreasing area.

13. The display device of claim 1, wherein the pixels are configured to be driven by the pixel rows.

14. The display device of claim 13, wherein the number of pixels configured to be driven during one of adjacent horizontal periods in at least one of the plurality of areas is different from the number of pixels configured to be driven during another thereof.

15. The display device of claim 1, wherein the display panel further comprises:
thin film transistors coupled to the pixels and to two lines of the oblique lines and the intersectional lines.

16. The display device of claim 15, wherein the data voltage has a first data voltage range, and each of the thin film transistors has a threshold voltage greater than an upper value of the first data voltage range.

17. The display device of claim 15, wherein a data voltage applied to each of the pixels has a first data voltage range, and a data voltage applied to each of the oblique lines and the intersectional lines has a second data voltage range different from the first data voltage range.

18. The display device of claim 17, wherein the second data voltage range is not overlapped with a range defined by a gate on voltage and a gate off voltage of the gate signal.

19. The display device of claim 1, wherein the plurality of areas comprises a main area and a sub area that are driven independently within a same frame.

20. The display device of claim 19, wherein the main area comprises a portion of the pixel rows coupled to at least one of two lines coupled to a first pixel row, from among the oblique lines and the intersectional lines, and
wherein the sub area comprises a remaining portion of the pixel rows that are not coupled to the two lines.

21. The display device of claim 19, wherein a pixel row of the main area and a pixel row of the sub area that are configured to be driven during a same horizontal period are configured to receive a data voltage and a gate signal via different lines.

22. A display device comprising:
a display panel comprising a display area configured to display an image and a non-display area adjacent to one side of the display area, the display area comprising gate lines, data lines crossing and isolated from at least a part of the gate lines, and pixels, wherein pixels being coupled to one of the gate lines or one of the data lines and arranged along a line in one direction are defined into pixel rows;
a timing controller configured to receive a control signal and an input image signal, and to output a first control signal, a second control signal, and a data signal;
a gate driver configured to generate a gate signal based on the first control signal, and to output the gate signal to the gate lines via the non-display area; and
a data driver configured to output a data voltage, obtained by converting the data signal, to the data lines via the non-display area in response to the second control signal,
wherein the display area further comprises a plurality of areas divided by the pixel rows being successive, and the number of pixels constituting one of adjacent ones of the pixel rows in at least one of the plurality of areas is different from the number of pixels constituting another thereof,
wherein the display panel has two adjacent edges extending in first and second directions that are different from each other,
wherein the display panel has first and second edges extending in the second direction and third and fourth edges extending in the first direction,
wherein ones of either the gate lines or the data lines extend along a first-sub direction from the first edge to the second edge, and other ones of the gate lines or data lines extend along the first sub-direction and a second sub-direction from the first edge toward the third edge in a zigzag shape across the display area,
wherein the first sub-direction is parallel to the first direction and the second sub-direction is parallel to the second direction, and
wherein ones of either the gate lines or the data lines extend in the first direction, and other ones of the gate lines or the data lines extend along the first direction and the second direction in a zigzag shape from one of the two adjacent edges to the other of the two adjacent edges across the display area.

23. The display device of claim 22,
wherein the gate lines extend in the first direction, and
wherein the data lines extend along the first direction and the second direction in the zigzag shape.

24. The display device of claim 23, wherein the non-display area is adjacent to one end of the first direction of the display area.

25. The display device of claim 23, wherein the pixel rows are formed of pixels coupled to respective data lines, and
wherein the plurality of areas comprise:
an increasing area in which the number of pixels constituting each pixel row increases every pixel row;
a maintaining area in which the number of pixels constituting each pixel row is equal to one another; and
a decreasing area in which the number of pixels constituting each pixel row decreases every pixel row.

26. The display device of claim 25, wherein the display panel further comprises:
a dummy line extending in a direction parallel to the gate lines; and
a contact portion coupling the dummy lines to data lines that are overlapped at one end of the first direction of the display area when viewed from a top, the overlapped data lines included in the decreasing area.

27. The display device of claim 26, wherein the dummy line is spaced apart from the gate lines at a same layer as the gate lines.

28. The display device of claim 27, wherein one end of the dummy line is coupled to the contact portion and another end thereof is in the non-display area.

29. The display device of claim 22, wherein the gate lines are coupled to same number of pixels, respectively.

30. The display device of claim 22,
wherein the data lines extend in the first direction, and
wherein the gate lines extend along the first direction and the second direction in the zigzag shape.

31. A display panel comprising:
a substrate including a first edge and a second edge facing the first edge in a first direction, a non-display area being defined between the first edge and pixels most adjacent to the first edge;
a pad disposed in the non-display area and configured to receive an external signal;
a plurality of first signal lines and a plurality of second signal lines disposed on the substrate and extending in the first direction in a display area configured to display an image;
a plurality of third signal lines disposed on the substrate and crossing the first signal lines in the display area;

a plurality of pixels coupled to the plurality of first signal lines and the plurality of the third signal lines, respectively, in the display area; and a plurality of contact portions electrically connected to the second signal lines and the third signal lines, respectively and disposed between the second edge of the substrate and pixels most adjacent to the second edge of the substrate.

32. The display panel of claim 31, wherein the contact portions are connected between the second signal lines and the third signal lines.

33. The display panel of claim 31, wherein the second signal lines and the third signal lines are disposed on different layers from each other.

34. The display panel of claim 31, wherein the first signal lines and the second signal lines are disposed on a same layer of the substrate from each other.

35. The display panel of claim 31, wherein the contact portions comprise a plurality of contact holes disposed between the second signal lines and the third signal lines and a conductive material filled in the contact holes.

* * * * *